(12) United States Patent
Radu

(10) Patent No.: US 12,028,001 B2
(45) Date of Patent: Jul. 2, 2024

(54) FLEXIBLE VOLTAGE TRANSFORMATION SYSTEM

(71) Applicant: Hitachi Energy Ltd, Zürich (CH)

(72) Inventor: Ion C. Radu, Raleigh, NC (US)

(73) Assignee: HITACHI ENERGY LTD, Zürich (CH)

( * ) Notice: Subject to any disclaimer, the term of this patent is extended or adjusted under 35 U.S.C. 154(b) by 768 days.

(21) Appl. No.: 16/848,130

(22) Filed: Apr. 14, 2020

(65) Prior Publication Data
US 2021/0320602 A1  Oct. 14, 2021

(51) Int. Cl.
*H01F 29/02* (2006.01)
*H01F 3/06* (2006.01)
*H02P 13/10* (2006.01)

(52) U.S. Cl.
CPC ............. *H02P 13/10* (2013.01); *H01F 3/06* (2013.01); *H01F 29/02* (2013.01)

(58) Field of Classification Search
CPC . H02P 13/10; H02P 13/06; H01F 3/06; H01F 29/02
See application file for complete search history.

(56) References Cited

U.S. PATENT DOCUMENTS 1,831,886 A * 11/1931 Ross .................. H01F 29/02
336/147
3,550,054 A * 12/1970 Carlo .................. H01F 29/025
336/120

FOREIGN PATENT DOCUMENTS

JP   H01122110 A  *  5/1989
WO  WO-2016041735 A1 *  3/2016  .......... G01F 23/296

* cited by examiner

*Primary Examiner* — Tuyen T Nguyen
(74) *Attorney, Agent, or Firm* — Sage Patent Group

(57) ABSTRACT

An apparatus having a first set of windings disposed about a first main leg of a transformer core, and a second set of windings disposed about a second main leg of the transformer core. The first set of windings are electrically coupled to the second set of windings to selectively provide a parallel connection and a series connection between the first set of windings and the second set of windings. Additionally, at least two windings of the first set of windings are electrically coupled to each other to selectively provide a parallel connection and a serial connection between the at least two windings of the first set of windings. Similarly, two windings of the second set of windings are electrically coupled to each other to selectively provide a parallel connection and a serial connection between the at least two windings of the second set of windings.

20 Claims, 12 Drawing Sheets

| HV | LV | | | | | | | |
|---|---|---|---|---|---|---|---|---|
| | 345 kV | 230 kV | 161 kV | 138 kV | 115 kV | 69 kV | 35 kV | 4 kV |
| 765 kV | 9 | 1 | 1 | 14 | 3 | 7 | 1 | 15 |
| 500 kV | 3 | 107 | 16 | 43 | 69 | 43 | 3 | 153 |
| 345 kV | - | 18 | 27 | 269 | 185 | 136 | 10 | 336 |
| 230 kV | - | - | 87 | 226 | 628 | 422 | 56 | 528 |
| 161 kV | - | - | - | 44 | 162 | 336 | 14 | 158 |
| 138 kV | - | - | - | - | 365 | 1129 | 35 | 476 |
| 115 kV | - | - | - | - | - | 390 | 213 | 337 |
| 69 kV | - | - | - | - | - | - | 109 | 264 |
FIGURE 1
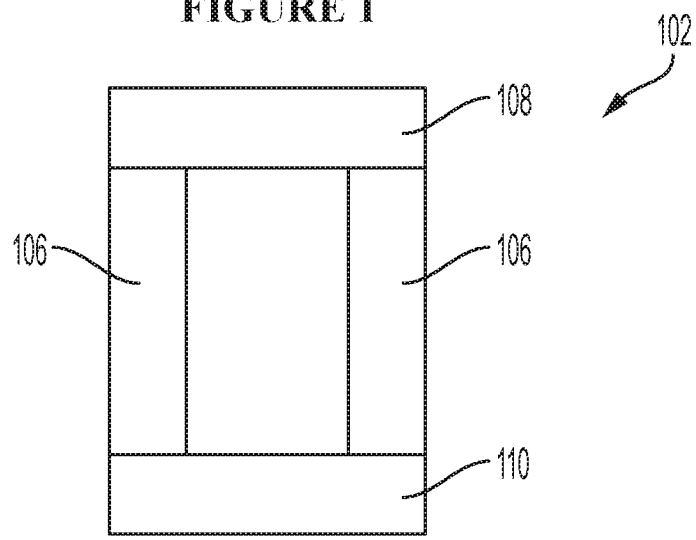
FIGURE 2A
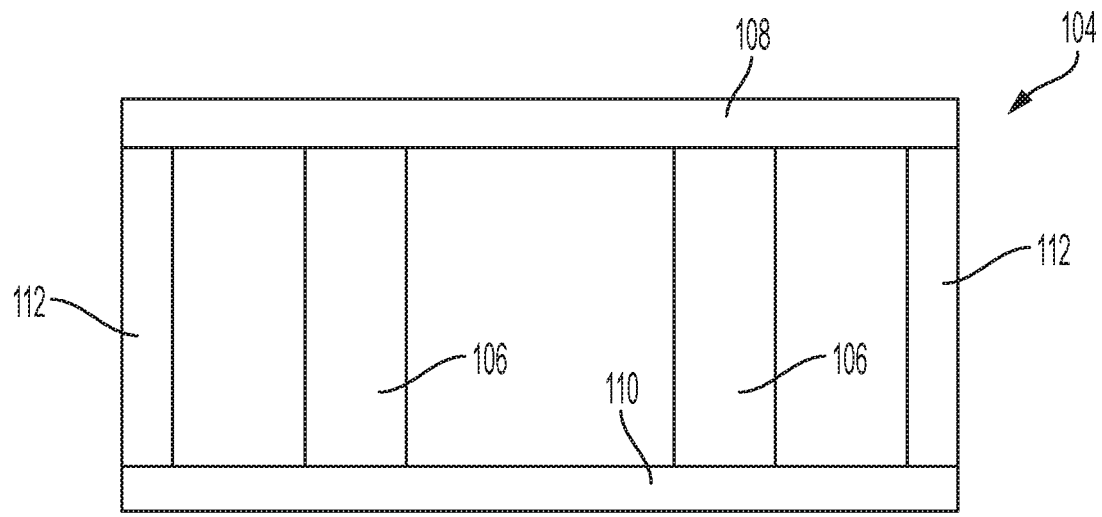
FIGURE 2B

FLEXIBLE VOLTAGE TRANSFORMATION SYSTEM

FIELD OF INVENTION

The present invention relates to power transformers, and more particularly, power transformers having the flexibility to provide a variety of different power grid voltage ratios.

BACKGROUND

Power transformers are used in the transmission of energy from a point of energy generation to a point of energy use. The generated energy is often transmitted over long distances at high voltages to a substation, where a transformer reduces the voltage level of the transmitted power for consumer consumption.

Power transformers generally include primary windings that receive varying currents and voltages to generate varying magnetic flux in a transformer core. The varying magnetic flux induces voltage in secondary windings, which provides output voltages and currents. The values of the output voltages and currents are directly related to the input voltages and currents as a result of the ratio of the number of turns of primary windings to the number of turns of secondary windings. Power transformers are often produced to meet specific requirements, including, for example, site-specific and/or end-user specific requirements. Such specific requirements can include, for example, specific voltages, power, impedance, sound level and losses (core or load losses), among other requirements.

FIG. 1 generally illustrates a representation of the number of substations in the United States that utilize a transformer for each power grid voltage ratio, as indicated by the U.S. Department of Energy, Office of Electrical Delivery and Energy Reliability. Such power grid voltage ratios are shown as a ratio of the low voltage (LV) and high voltage (HV) ratings of the transformer in kilovolts (kV). As indicated by FIG. 1, different sites and/or end users may have different requirements for transformers, including, for example, different power grid voltage ratios. Further, traditionally, transformers are manufactured to meet a specific power grid voltage ratio. Accordingly, such power transformers typically are not mass-produced.

A relatively large amount of design time is often involved in attaining an optimal and economic transformer design that can meet the specific requirements of the customer, including, for example, being able to satisfy a particular power grid voltage ratio. Additionally, following such design time, additional time is also needed to construct such specific and relatively large transformer(s), which can thus result in relatively long lead times. For example, more than five months may pass from the initial customer request before a customer receives final delivery of the transformer.

Power transformers are also difficult to transport. For example, large transformers can weigh two-hundred (200) tons or more, and thus cannot be easily transported over existing roads. Due to these difficulties, special transportation arrangements are typically required to select an adequate roadway and to select a time of delivery, often during the middle of the night to reduce potential adverse effects on traffic flow.

Further, if something goes wrong with the power transformer, the entire transformer unit typically goes offline, which can affect the entire system to which the transformer provides energy. These failures are especially problematic at certain power substations that are deemed critical. Additionally, repairs of such transformers can be costly and time consuming. For example, repair of a transformer can involve draining fluid from within the associated tank, removing the transformer from the tank, identifying a possible basis for the failure (if possible), transporting the transformer to a repair facility, disassembly and removal of the failed component(s), confirming the identified failure, redesigning the failed component, testing the redesigned component, reassembling the transformer with the redesigned component, testing the reassembled transformer, and again delivering the transformer back to the site. Thus, in at least certain instances, in the event of a transformer failure, it may be more feasible to build a new replacement transformer.

Accordingly, although various transformers are available currently in the marketplace, further improvements are possible.

BRIEF SUMMARY

An aspect of an embodiment of the present application is an apparatus that can include a transformer core, and a first set of windings that are disposed about a first main leg of the transformer core. The apparatus can also include a second set of windings that are disposed about a second main leg of the transformer core. Additionally, the first set of windings can be electrically coupled to the second set of windings to selectively provide a parallel connection and a series connection between the first set of windings and the second set of windings.

Another aspect of an embodiment of the present application is an apparatus that can include a first set of windings comprising at least one first low voltage winding and at least one first high voltage winding, the at least one first high voltage winding including at least one winding having a voltage rating that is higher than a voltage rating of the at least one first low voltage winding. The apparatus can also include a second set of windings comprising at least one second low voltage winding and at least one second high voltage winding, the at least one second high voltage winding including at least one winding having a voltage rating that is higher than a voltage rating of the at least one second low voltage winding. Additionally, the apparatus can include a parallel electrical connection and a serial electrical connection between the at least one first low voltage winding and the at least one second low voltage winding, and a parallel electrical connection and a serial electrical connection between the at least one first high voltage winding and the at least one second high voltage winding.

Additionally, an aspect of an embodiment of the present application is an apparatus that can include a first set of windings that are disposed about a first leg of a transformer core, at least two windings of the first set of windings being electrically coupled to selectively provide a parallel connection and a serial connection between the at least two windings of the first set of windings. Further, the apparatus can also include a second set of windings that are disposed about a second leg of the transformer core, at least two windings of the second set of windings being electrically coupled to selectively provide a parallel connection and a serial connection between the at least two windings of the second set of windings. Additionally, the first set of windings can be electrically coupled to the second set of windings to selectively provide a parallel connection and a serial connection between the first set of windings and the second set of windings.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

FIG. 1 provides a table identifying examples of power grid ratios, and the number of transformers used for such power grid ratios in substations in the United States, as indicated by the U.S. Department of Energy, Office of Electrical Delivery and Energy Reliability.

FIGS. 2A and 2B illustrate front side views of exemplary D (two main limbs core) and DY (two main limbs and two side limbs core) transformer core types, respectively, for single-phase power transformers.

Figure 3A:
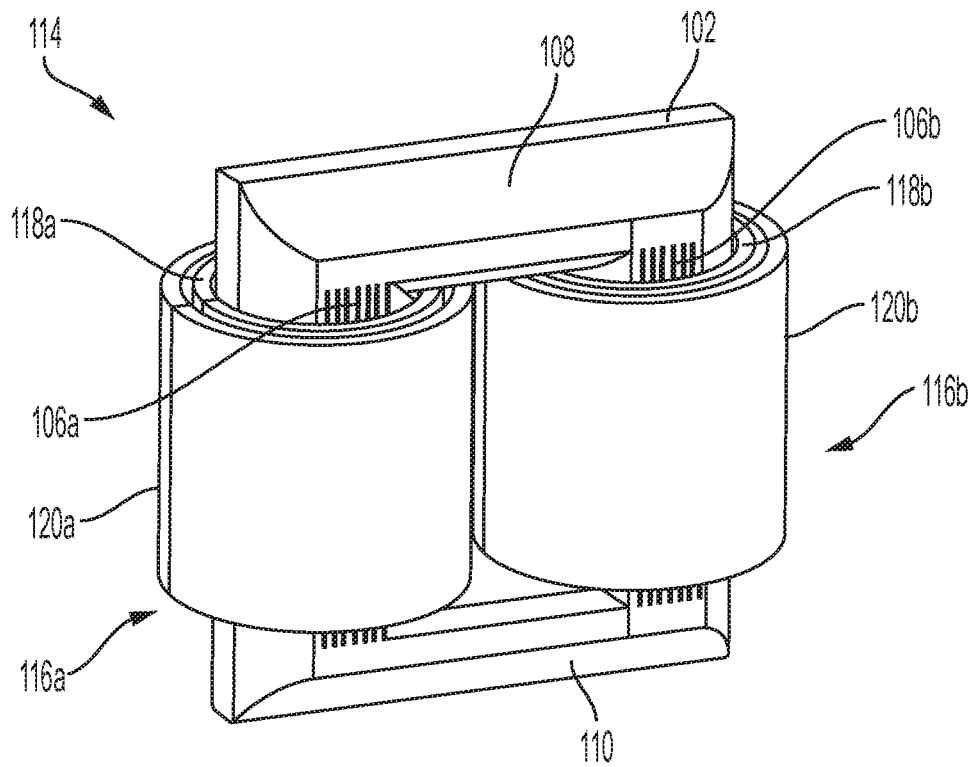
FIG. 3A illustrates a front side perspective view of an exemplary active part for a D type transformer core having four power grid voltage ratios according to an embodiment of the subject application.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

FIGS. 2A and 2B illustrate front side views of exemplary D and DY transformer core types 102, 104, respectively, for single-phase power transformers. As shown, the transformer core 102, 104 can have one or more main legs 106 that extend between opposing top and bottom yokes 108, 110 of the transformer core 102, 104. Additionally, as seen in FIG. 2B, according to certain embodiments, the transformer core 104 can include one or more side limbs or legs 112 that can also extend between the top yoke 108 and the bottom yoke 110. The number of main legs 106 and side legs 112, if any, can vary with the needs of the application.

The transformer core 102, 104 can be constructed to form a magnetic flux path, such as, for example, a low reluctance path, between, and through, its various components. For example, the transformer core 102, 104 can be constructed to form a magnetic flux path between, and through, the top and bottom yokes 108, 110, main legs 106, and, in at least some embodiments, the side legs 112. However, the transformer core 102, 104 can have a variety of other configurations and/or components that can thus result in the formation of different flux paths. Attaining such variations in flux path can be related, for example, to differences in at least the number of main legs 106 and side legs 112 of the transformer core 102, 104, as well as variations in the material(s) used to construct the transformer core 102, 104. According to certain embodiments, the transformer core 102, 104 can be constructed of electrical steel that provides a relatively low reluctance magnetic flux path.

FIG. 3A illustrates a front side perspective view of an exemplary active part 114 for a transformer having a D type transformer core 102, as seen in FIG. 2A, having four power grid voltage ratios according to an embodiment of the subject application. According to the illustrated embodiment, the active part 114 can include the transformer core 102 and one or more sets of windings 116a, 116b. As seen, according to the illustrated embodiment, each set of windings 116a, 116b can be disposed around a corresponding main leg 106 of the transformer core 102. Further, according to the illustrated embodiment, each set of windings 116a, 116b can include one or more low voltage windings 118a, 118b and one or more high voltage windings 120a, 120b. Further, each set of windings 116a, 116b can be similar, if not identical, with respect to at least the number, configurations, and voltage ratings of both the low voltage windings 118a, 118b and the high voltage windings 120a, 120b.

For example, FIG. 3A illustrates a first set of windings 116a positioned about a first leg 106a of the transformer core 102, and a second set of windings 116b positioned about the second main leg 106b of the transformer core 102. As shown, both the first set of windings 116a and the second set of windings 116b have one low voltage winding 118a, 118b and one high voltage winding 120a, 120b. Further, the low voltage winding 118a of the first set of windings 116a has a configuration that is similar to that of the low voltage winding 118b of the second set of windings 116b, such as, for example, with respect to at least the voltage rating and/or number of low voltage windings 118a, 118b. Thus, if the first set of low voltage windings 116a were to include a second low voltage winding (not shown), the second set of low voltage windings 116b would also include a similar second low voltage winding. Similarly, the first high voltage windings 120a, 120b of the first and second sets of windings 116a, 116b are also generally similar to each other with respect to, for example, at least the voltage rating and/or number of high voltage windings 120a, 120b. Thus, the number of high voltage windings 120a for the first set of windings 116a is that same as the number of high voltage windings 120b for the second set of windings 116b. Thus, in general terms, a degree of symmetry is provided between the configurations of the different sets of windings 116a, 116b for a particular active part 114 of the transformer.

Figure 3B:
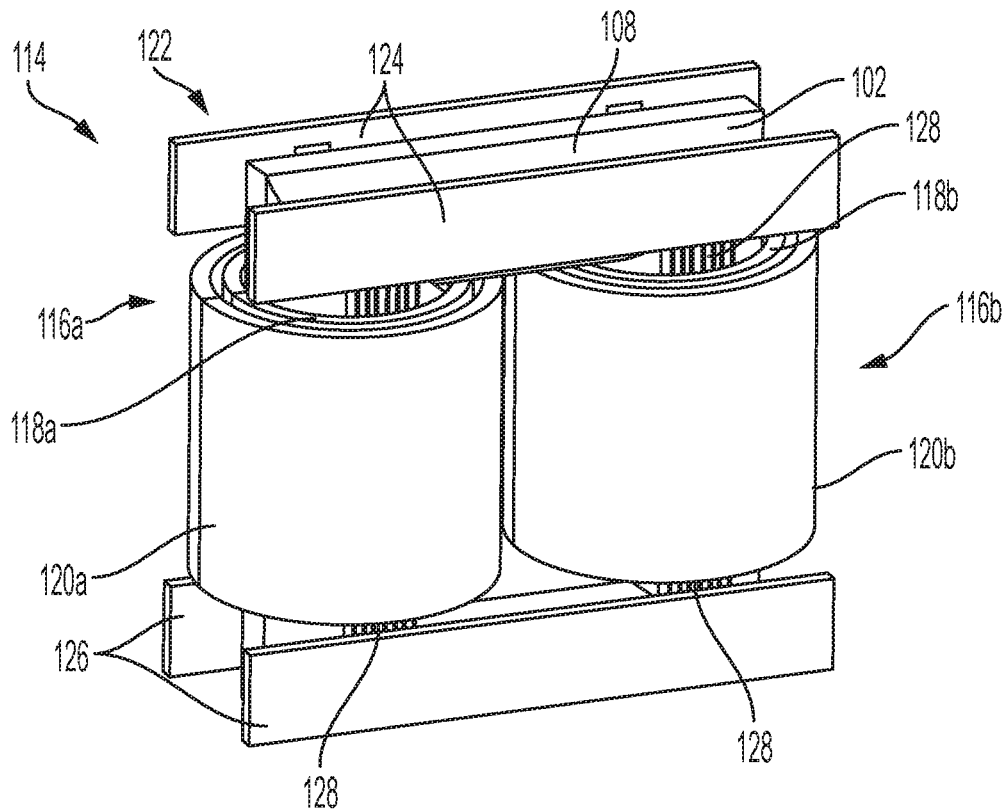
FIG. 3B illustrates a front side perspective view of the active part shown in FIG. 3A with a core clamping structure according to an embodiment of the subject application.

FIG. 3B illustrates a front side perspective view of the active part 114 shown in FIG. 3A with a core clamp 122 according to an embodiment of the subject application. The core clamp 122 can include two top core clamps 124, two bottom core clamps 126, and a plurality of flitch plates 128. The flitch plates 128, which can include flitch plates 128 that extend along the main legs 106a, 106b and flitch plates 128 that extend along the side legs 112 (FIG. 6B), can be fixed or secured to each of the top clamp 124 and the bottom clamp 126 in variety of manners, including, for example, via pins, fasteners, clips and/or other retaining and/or fastening features. Additionally, the flitch plates 128 can be constructed to transmit mechanical loads between at least the top yoke 108 and the bottom yoke 110. Moreover, mechanical loads, e.g., tensile loads, can be transmitted between the top and bottom yokes 108, 110 by the flitch plates 128. The flitch plates 128 can also be configured to support the weight of the transformer core 102, 104, including against relatively high axial and radial forces that can be generated at least by high current that may be present in the sets of windings 116a, 116b in connection with a short circuit in the power grid.

Figure 4:
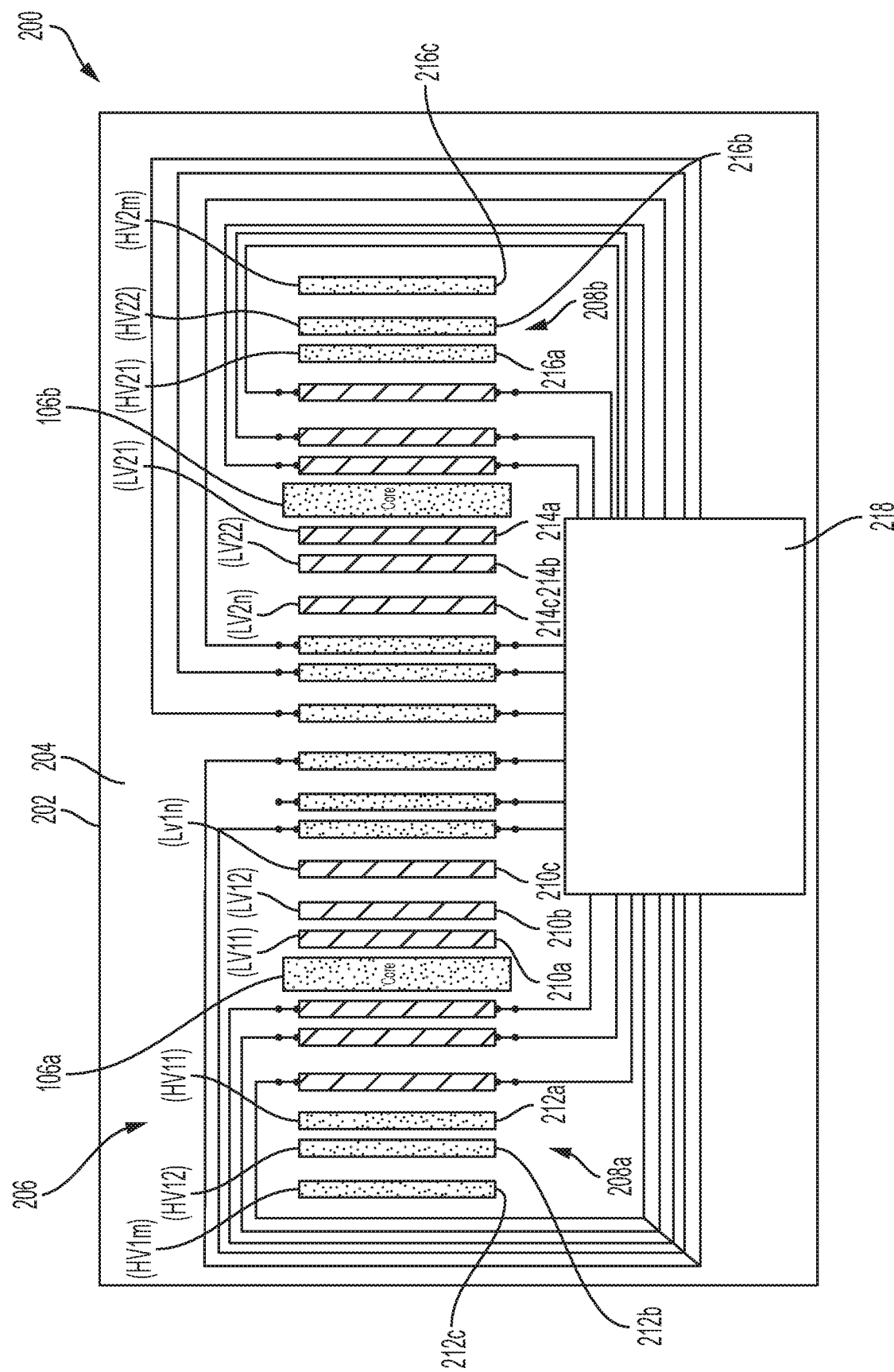
FIG. 4 illustrates a representation of a configuration for a portion of an active part for an exemplary multi-voltage power transformer according to an embodiment of the subject application.

The general symmetry of the first and second sets of windings 116a, 116b discussed above with respect to FIG. 3A is further depicted, for example, by FIG. 4, which illustrates a portion of a transformer 200 having a tank or housing 202. As seen, within an interior region 204 of the housing 202 is a representation of a portion of an active part 206 having a first set of windings 208a that are positioned about a first main leg 106a of a core 102 (FIG. 2A), and a second set of windings 208b that are positioned about a second main leg 106b of the core 102. As shown, the first set of windings 208a has n number of low voltage windings 210a, 210b, 210c (LV11, LV12 ... LV1n) positioned about the first main leg 106a of the transformer core 102, where n is a whole number greater than zero. Accordingly, the second set of windings 208b also has n number of corresponding low voltage winding 214a, 214b, 214c (LV21, LV22 ... LV2n) positioned around the second main leg 106b of the transformer core 102. Further, as previously mentioned, the voltage ratings for the low voltage windings 210a, 210b, 210c of the first set of windings 208a can be the same as the voltage ratings of the corresponding low voltage windings 214a, 214b, 214c of the second set of winding 208b. Thus, for example, the maximum voltage rating for the first low voltage winding 210a (LV11) of the first set of windings 208a can be generally the same as the voltage rating for the corresponding first low voltage winding 214a (LV21) of the of second set of windings 208b, and the maximum voltage rating for the second low voltage winding 210b (LV12) of the first set of windings 208a can be generally the same as the voltage rating for the corresponding second low voltage winding 214b (LV22) of the of second set of windings 208b.

Similarly, as also shown in FIG. 4, the first set of windings 208a has m number of high voltage windings 212a, 212b, 212c (HV11, HV12, ... HV1m) positioned about the first main leg 106a of the transformer core 102, where m is a whole number greater than zero. Accordingly, the second set of windings 208b also has m number of corresponding high voltage windings 216a, 216b, 216c (HV21, HV22, ... HV2m) positioned around the second main leg 106b of the transformer core 102. Further, as previously mentioned, the voltage ratings for the high voltage windings 212a, 212b, 212c of the first set of windings 208a can be the same as the voltage ratings of the corresponding high voltage winding 216a, 216b, 216c of the second set of winding 208b. Thus, for example, the maximum voltage rating for a first high voltage winding 212a (HV11) of the first set of windings 208a can be generally similar, if not the same, as the voltage rating for the corresponding first high voltage winding 216a (HV21) of the of second set of windings 208b.

As discussed below, according to the illustrated embodiment, two or more of the low voltage windings 210a, 210b, 210c (LV11, LV12, ... LV1n) of the first set of windings 208a can wired for both parallel and series electrical connections with each other, as well as wired for both parallel and series connections with one or more of the low voltage windings 214a, 214b, 214c (LV21, LV22, ... LV2n) of the second set of windings 208b. Similarly, two or more high voltage windings 212a, 212b, 212c (HV11, HV12, ... HV1m) of the first set of windings 208a can be wired for both parallel and series electrical connections with each other, as well as wired for parallel and series connections with one or more of the high voltage windings 216a, 216b, 216c (HV21, HV22, ... HV2m) of the second set of windings 208b. The various possible combinations of (1) selectable parallel and series connections between two or more of the low voltage windings 210a, 210b, 210c of the first set of windings 208a, (2) selectable parallel and series connections between two or more of the low voltage windings 214a, 214b, 214c of the second set of windings 208b, and (3) selectable parallel and series connections between two or more of the low voltage windings 210a, 210b, 210c, 214a, 214b, 214c of the first and second sets of windings 208a, 208b can result in a single transformer 200 having the capability to provide a variety of different low voltages. Similarly, the various possible combinations of (1) selectable parallel and series connections between two or more of the high voltage windings 212a, 212b, 212c of the first set of windings 208a, (2) selectable parallel and series connections between two or more of the high voltage windings 216a, 216b, 216c of the second set of windings 208b, and (3) selectable parallel and series connections between two or more of the high voltage windings 212a, 212b, 212c, 216a, 216b, 216c of the first and second sets of windings 208a, 208b can result in a single transformer 200 having the capability to provide a variety of different high voltages. Moreover, the end-user has the ability to select from a plurality of low voltage to high voltage power grid voltage ratio options that are provided by the transformer 200 merely by selectively utilizing the various existing parallel or series electrical connections within and between windings 210A-C, 212A-C, 214A-C, 216A-C of the first and second sets of windings 208a, 208b.

Further, selecting which of the parallel or series electrical connections to utilize for the low voltage windings 210A-C, 214A-C of the first and second sets of windings 208a, 208b does not necessitate a similar selection between the parallel or series electrical connections for the high voltage windings 212A-C, 216A-C of the first and second sets of windings 208a, 208b, and vice versa. Instead, as demonstrated below, the selections between the parallel or series electrical connections for the low voltage windings 210A-C, 214A-C and the high voltage windings 212A-C, 216A-C can be based, for example, on the particular power grid voltage ratio that transformer 200 is to attain. Such independent selection of the connections to utilize with, and between the windings of the first and second set of windings 208a, 208b can further enhance the ability of the end user to utilize a single transformer 200 to selectively provide a plurality of at least some of the power grid voltage ratios shown in FIG. 1.

Figure 5A:
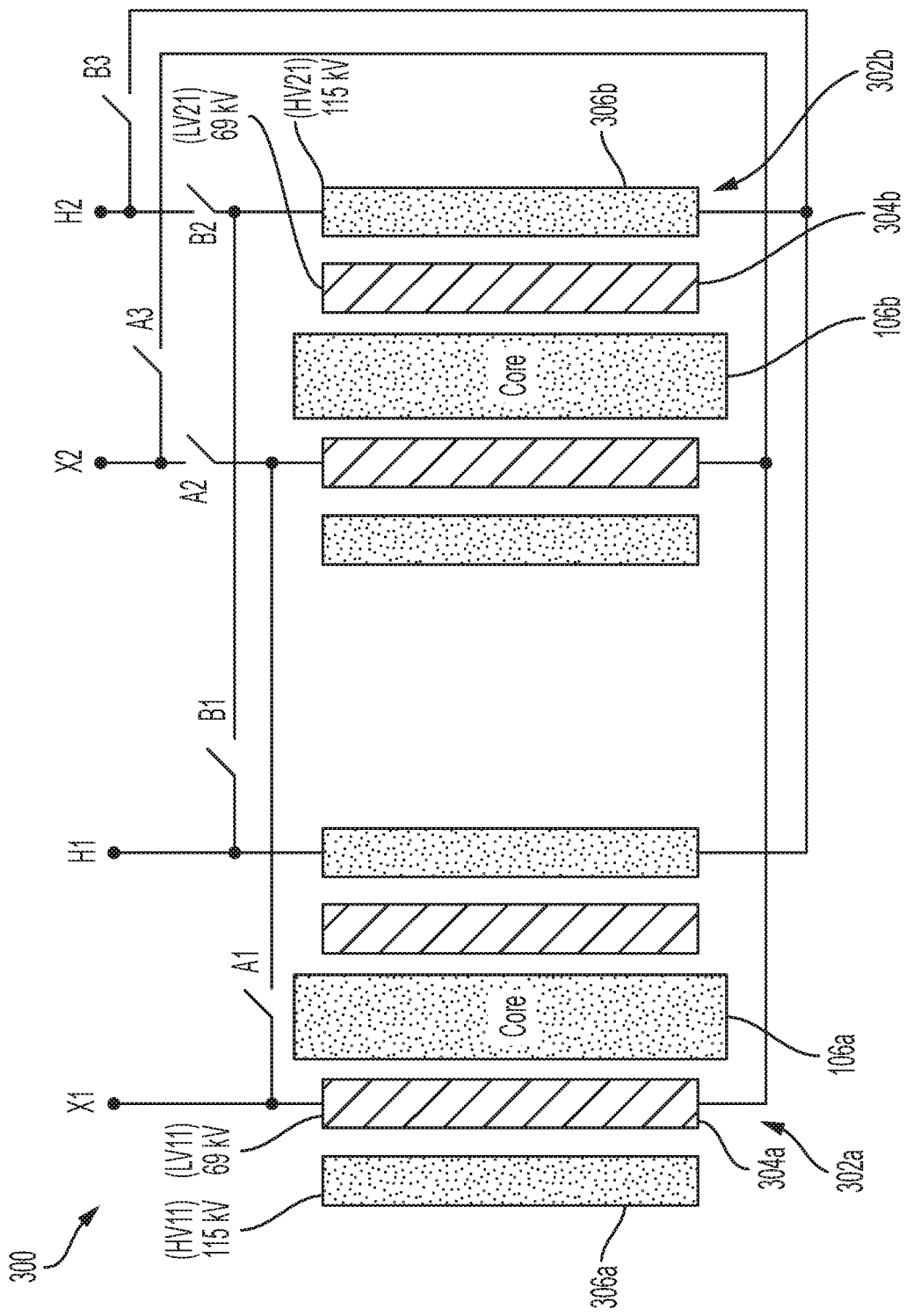
FIG. 5A illustrates an exemplary wiring diagram for the transformer core shown in FIGS. 3A and 3B having low voltage and high voltage cleats and leads connections on both the low voltage and high voltage sides according to an embodiment of the subject application.
Figure 5B:
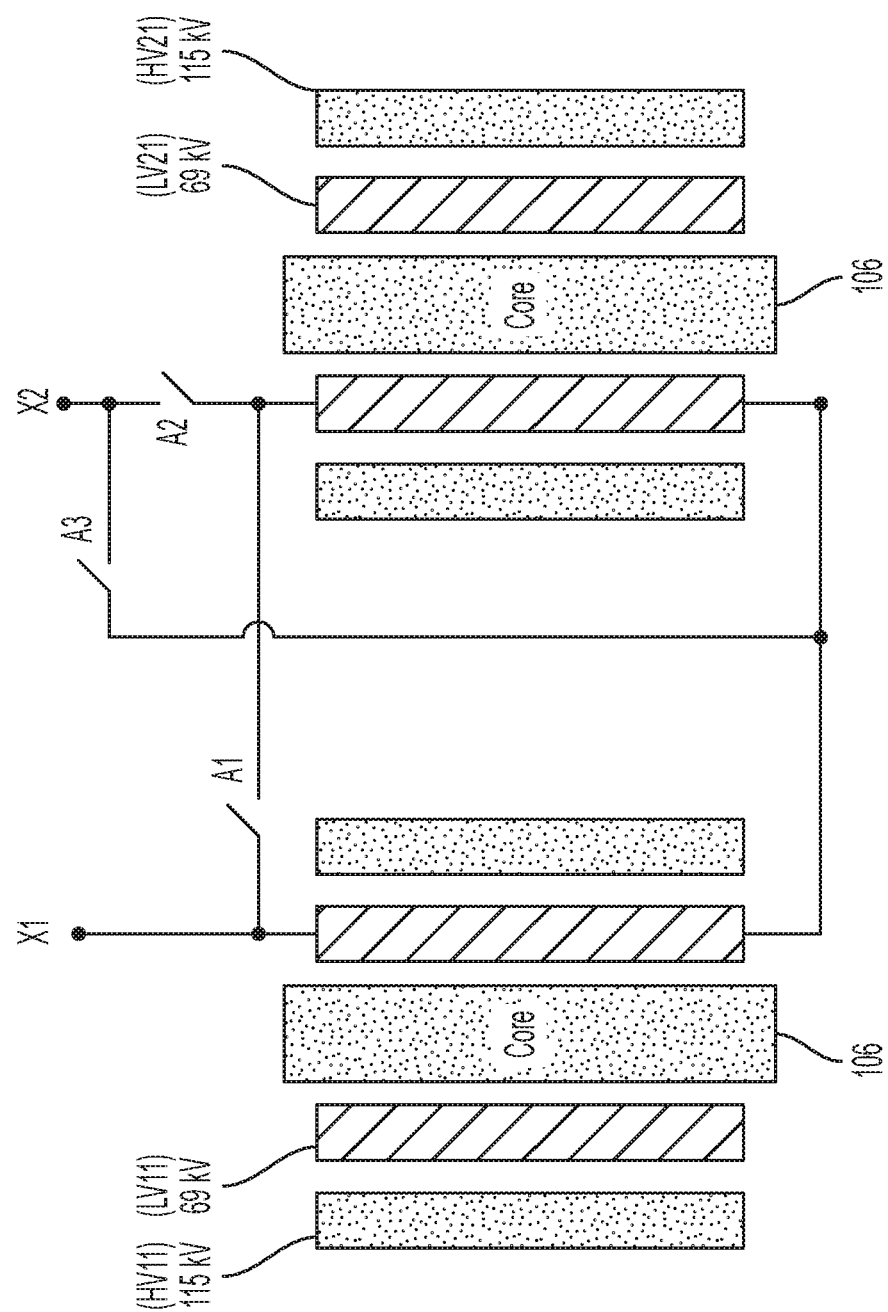
FIG. 5B illustrates a representation of the portion of the wiring diagram from FIG. 5A for the low voltage windings, including the low voltage cleats and leads connections on the low voltage side of the transformer.
Figure 5C:
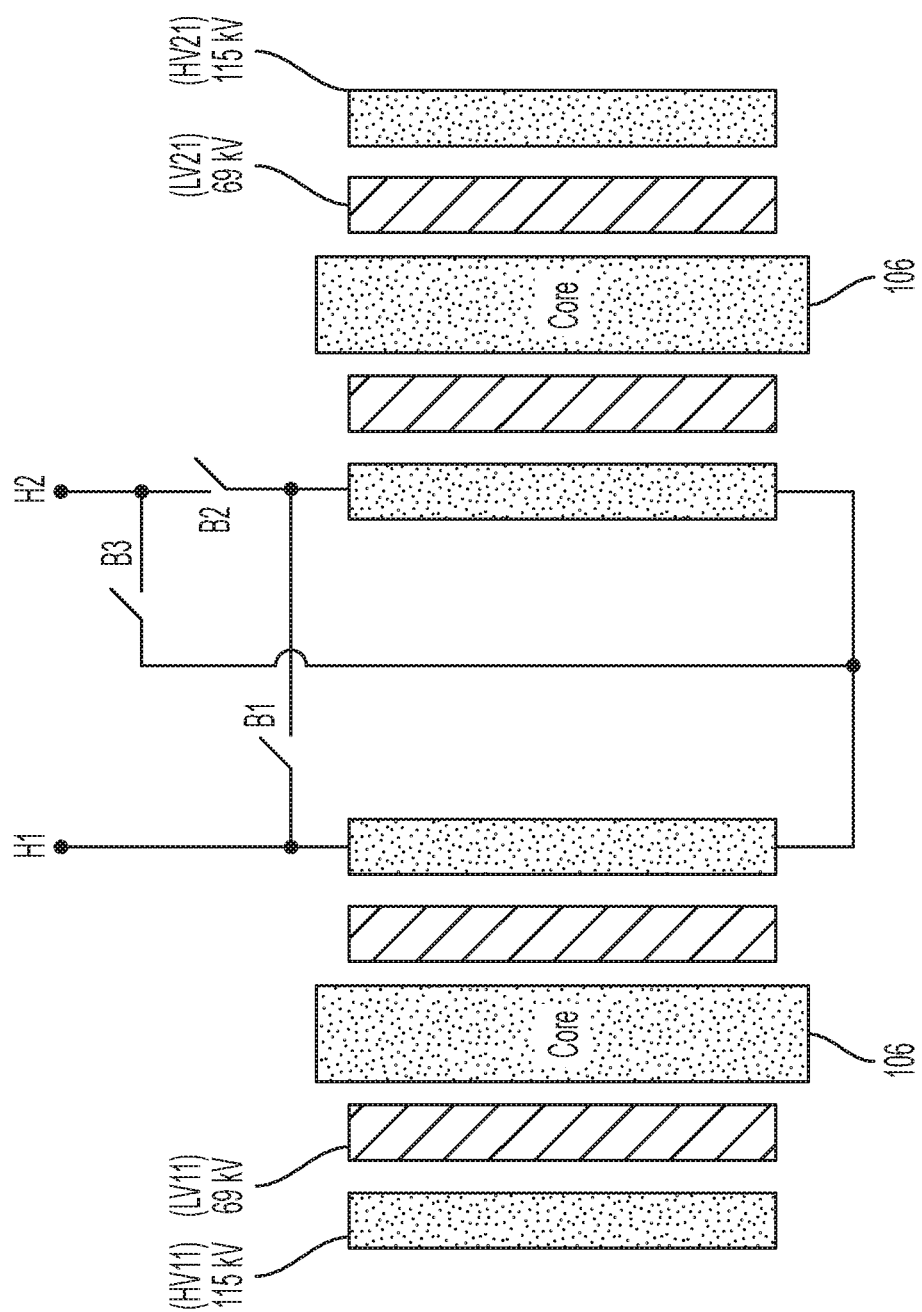
FIG. 5C illustrates a representation of the portion of the wiring diagram from FIG. 5A for the high voltage windings, including the high voltage cleats and leads connections on the high voltage side of the transformer.

For example, FIGS. 5A-5C illustrate an exemplary wiring diagram for an active part 300 using the transformer core 102 shown in FIGS. 3A and 3B. As shown, a first set of windings 302a, which are positioned about a first main leg 106a of the transformer core 102, include one low voltage winding 304a (LV11) having a voltage rating of 69 kilovolts (kV), and a single high voltage winding 306a (HV11) having a voltage rating of 115 kV. Accordingly, the second set of windings 302b, which are positioned around the second main leg 106b of the transformer core 102, also has one low voltage winding 304b (LV21) having a voltage rating of 69 kilovolts (kV), and a single high voltage winding 306b (HV21) having a voltage rating of 115 kV. Further, according to the illustrated embodiment, the low voltage winding 304a (LV11) of the first set of windings 302a is connected to a first low voltage bushing X1, such as, for example, via one or more cleats, leads, cables, and/or bus bars, and the low voltage winding 304b (LV21) of the second set of windings 302b is selectively connectable to a second low voltage bushing X2, such as, for example, via associated cleats, leads, cables, and/or bus bars. Similarly, the high voltage winding 306a (HV11) of the first set of windings 302a is connected to a first high voltage bushing H1, such as, for example, by one or more cleats, leads, cables, and/or bus bars, and the high voltage winding 306b (HV21) of the second set of windings 302b is selectively connectable to a second low voltage bushing H2, such as, for example, by one or more cleats, leads, cables, and/or bus bars.

As illustrated in FIGS. 5A and 5B, the first and second low voltage windings 304a, 304b (LV11, LV21) of the first and second sets of windings 302a, 302b of the transformer 200 can be selectively connected in either parallel or series via the opened or closed positions of a plurality of LV switches A1, A2, A3. For example, in the illustrated embodiment shown in FIG. 5A, the transformer 200 can be configured to selectively allow the first low voltage winding 304a (LV11) to be connected in parallel to the second low voltage winding 304b (LV21) by the combination of: (1) closure of a first LV switch A1, (2) opening a second LV switch A2, and (3) closure of a third LV switch A3. By being connected in parallel, in the illustrated embodiment in which the first and second low voltage windings 304a, 304b (LV11, LV21) are each rated at 69 kV, the low voltage rating of the transformer 200 can also be 69 kV.

However, in the event the user wishes the same transformer 200 to instead have a higher low voltage rating, the user can facilitate the opening or closing of one or more of the LV switches A1, A2, A3 so that the first and second low voltage windings 304a, 304b (LV11, LV21) are instead connected in series. For example, in such an embodiment, the first and second low voltage windings 304a, 304b (LV11, LV21) of the first and second sets of windings 302a, 302b can be connected in series by the second LV switch A2 being closed, and the first and third LV switches A1, A3 being opened. According to the illustrated embodiment in which the first and second low voltage windings 304a, 304b (LV11, LV21) are each rated at 69 kV, connecting the first and second low voltage windings 304a, 304b (LV11, LV21) in series can result in the transformer 200 having a low voltage rating of 138 kV.

Similarly, FIGS. 5A and 5C illustrate wiring connections for the first and second high voltage windings 306a, 306b (HV11, HV21) of the first and second sets of windings 302a, 302b of the transformer 200 that can be selectively connected in either parallel or series via the open or closed positions of a plurality of HV switches B1, B2, B3. For example, in the illustrated embodiment shown in at least FIG. 5C, the transformer 200 can be configured to selectively allow the first high voltage winding 306a (HV11) to be connected in parallel to the second high voltage winding 306b (HV21) by the combination of: (1) closure of a first HV switch B1, (2) opening of a second HV switch B2, and (3) close of a third HV switch B3. By being connected in parallel, in the illustrated embodiment in which the first and second high voltage windings 306a, 306b (HV11, HV21) are each rated at 115 kV, the high voltage rating of the transformer 200 can also be 115 kV.

However, in the event the user wishes the same transformer 200 to instead have a higher high voltage rating, the user can facilitate the opening or closing of one or more of the HV switches B1, B2, B3 so that the first and second high voltage windings 306a, 306b (HV11, HV21) are instead connected in series. For example, according to the illustrated embodiment, the first and second high voltage windings 306a, 306b (HV11, HV21) to be connected in parallel by closing the second HV switch B2 and opening the first and third HV switches B1, B3. According to the illustrated embodiment in which the first and second high voltage windings 306a, 306b (HV11, HV21) are each rated at 115 kV, connecting the first and second high voltage windings 306a, 306b (HV11, HV21) in series can result in the transformer 200 having an increased high voltage rating of 230 kV.

Additionally, whether the first and second low voltage windings 304a, 304b are currently connected in the series or parallel configurations is not dependent on the selected series or parallel configuration that is currently being used for the first and second high voltage windings 306a, 306b, and vice versa. Accordingly, the illustrated example affords the transformer 200 to selectively provide one of four different possible low/high voltage ratios, namely (1) 69 kV/115 kV, wherein the first and second low voltage windings 304a, 304b are connected in parallel, and the first and second high voltage windings 306a, 306b are connected in parallel, (2) 69 kV/230 kV, wherein the first and second low voltage windings 304a, 304b are connected in parallel, and the first and second high voltage windings 306a, 306b are connected in series, (3) 138 kV/115 kV, wherein the first and second low voltage windings 304a, 304b are connected in series, and the first and second high voltage windings 306a, 306b are connected in parallel, and (4) 138 kV/230 kV, wherein the first and second low voltage windings 304a, 304b are connected in series, and the first and second high voltage windings 306a, 306b are connected in series. Thus, according to the foregoing example, the illustrated embodiment a single transformer 200 can be constructed, and selectively used satisfy four different low/high voltage power grid ratios.

The selection between parallel and series connections can be attained in a variety of manners, including, but not limited to, wired, switch, plug and socket connections, and/or a combination thereof, among other manner of establishing such connections. The parallel and series connections of the windings for the transformer 200 can be made using fixed connections, flexible connections, or tap changers. The fixed and flexible connections can be inside of a tank that houses the transformer 200, also referred to as a transformer tank, or in a separate connection box situated inside or outside of the transformer tank. Flexible connections can utilize plug and plug HV connectors, among other types of flexible connections. Additionally, according to other embodiments, the series and parallel connections between the windings of the transformer 200 can be adjusted via use of tap changers, such as, for example, de-energized tap changers (DETC) and on load tap changers (OLTC). The rating of the tap changers utilized for adjusting the voltage ratios outputted by the transformer 200 via the selection of the parallel and/or series connections between the windings of the transformer 200 can be based on a variety of criteria relating to the transformer 200, including: maximum voltage class, maximum test voltage (e.g., basic insulation level (BIL) for impulse, switching voltage), and maximum current, which can depend on the voltage class and power of the transformer 200.

For example, according to certain embodiments, the parallel and series connections between can be fixed connections inside of the transformer 200, such as, for example, fixed connections that are located within the interior region 204 of the housing 202 (FIG. 4) of the transformer 200. Such connections can, according to certain embodiments, be prewired via prewired cables, and, depending on the voltage class of the associated transformer 200, can include at least right ducts. According to such an embodiment, the connections can be positioned at a relatively easily accessible location within the housing 202 so as to accommodate changes in the parallel and series connections, and thereby readily accommodate changes in the power grid voltage ratio that is outputted by the transformer 200.

Alternatively, according to other embodiments, the connectors that can be utilized to selectively having the windings 210A-C, 212A-C, 214A-C, 216A-C of the transformer 200 connected in parallel or series can be contained within a selector housing 218 (FIG. 4), which can be housed within, or outside of, the housing 202 of the transformer 200, and moreover, may or may not be mounted to the transformer 200. In embodiments in which the selector housing 218 is positioned outside of the transformer 200, adjustments of the voltages that can be attained by selectively connecting the windings of the transformer 200 in series and/or parallel can occur without opening, or going inside of, the transformer 200. Further, for example, with respect to the embodiment depicted FIGS. 5A-5C, the low and high voltage switches A1-A3 and B1-B3 can be fixed pre-wired connections that are housed within the selector housing 218, which can be a housing that is different from the housing of the transformer 200, and can include right ducts, which can, for example, be utilized to obtain particular dielectric distances between different connectors within the selector housing 218. Additionally, according to certain embodiments, the selector housing 218 can have an insulated environment within the selector housing 218 that can be different than the insulation used for the windings of the transformer 200, such as, for example, in an oil, ester, sulfur hexafluoride (SF6), or vacuum insulated environment.

Additionally, according to certain embodiments, the selector housing 218 can be positioned outside of the transformer 200, and can be configured to adjustably change the series and parallel connections between the windings 210A-C, 212A-C, 214A-C, 216A-C and the sets of windings 208a, 208b of the transformer 200 using a de-energized tap changer (DETC) or, alternatively, an on load tap changer (OLTC). The DETC and OLTC can be selected based on the DETC and OLTC being rated for the highest voltage class, highest test voltage, and maximum current (depending on the class voltage and power of the transformer) that can be attained by the transformer 200. Additionally, the DETC or OLTC can also be selected based on the ability of the DETC or OLTC to have a maximum voltage difference when changing the tap that is lower than maximum admissible contact voltage for the DETC or OLTC.

Figure 6A:
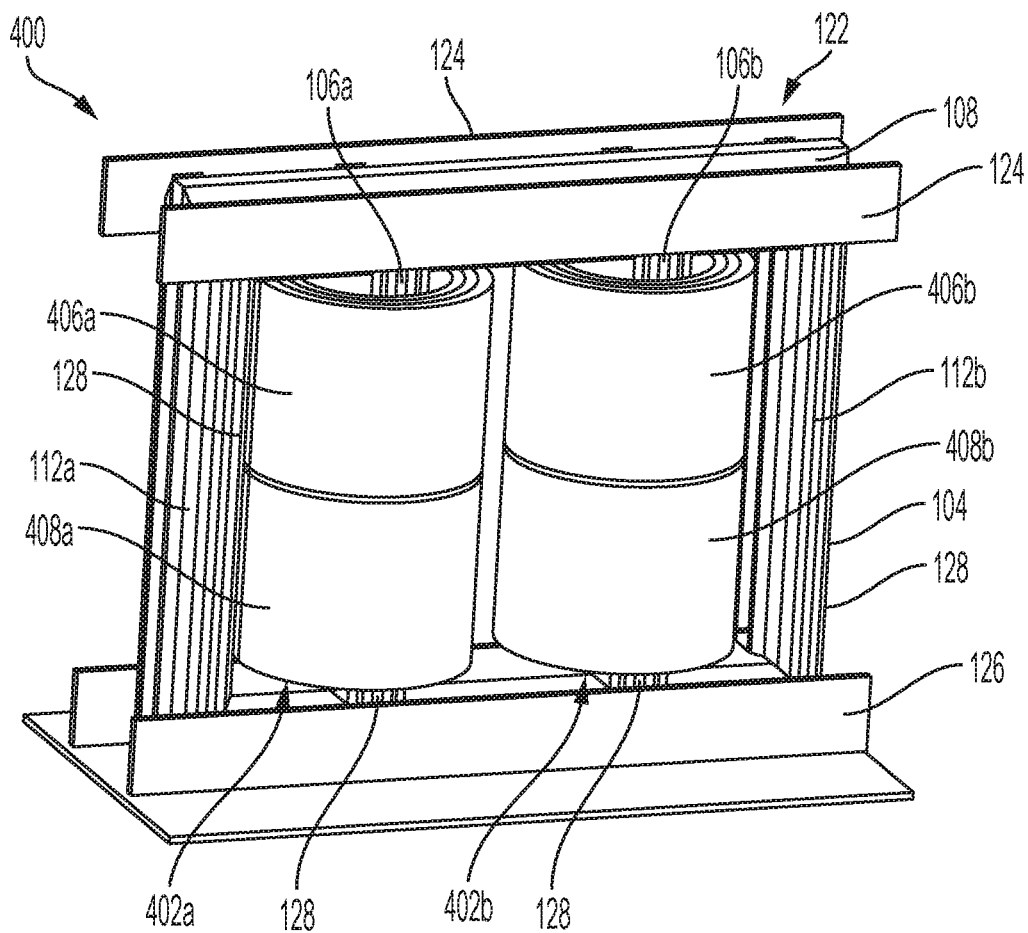
FIGS. 6A and 6B illustrate front side perspective and top side views, respectively, of an exemplary active part for a DY core transformer having six power grid voltage ratios according to an embodiment of the subject application.
Figure 6B:
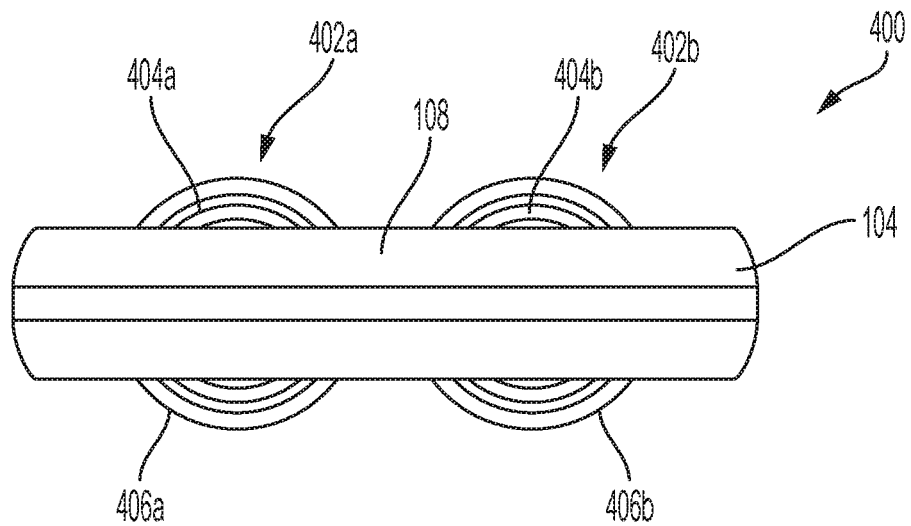

The above examples can also be modified for use with other types of transformer core configurations, as well as a variety of other types, ratings, configurations, and number of low and high voltage windings. For example, FIGS. 6A and 6B illustrate an exemplary active part 400 of a transformer 200 comprising a DY transformer core 104, and in which the active part 400 is configured to provide six different power grid voltage ratios. According to the illustrated embodiment, the active part 400 can include the transformer core 104 and two sets of windings 402a, 402b. Moreover, the DY transformer core 104 can include a pair of inner main legs 106a, 106b, and an outer pair of side legs 112a, 112b. Each set of windings 402a, 402b can be disposed around a corresponding main leg 106a, 106b of the transformer core 104. Further, according to the illustrated embodiment, each set of windings 402a, 402b can include one or more low voltage windings 404a, 404b and one or more high voltage windings 406a, 408a, 406b, 408b. For example, as shown by the exemplary embodiment shown in FIGS. 6A and 6B, the first set of windings 402a can include a low voltage winding 404a and a pair of high voltage windings 406a, 408a, while the second set of windings 402b includes a low voltage winding 404b, and a pair of high voltage windings 406b, 408b. As see, each pair of high voltage winding 406a, 408a, 406b, 408b, respectively, can generally be positioned along opposite halves of the associated low voltage winding 404a, 404b. Further, each set of windings 402a, 402b can be similar, if not identical, with respect to at least the number, configurations, and voltage ratings for the low voltage windings 404a, 404b, the first high voltage windings 406a, 406b, and the second high voltage windings 408a, 408b.

Figure 7A:
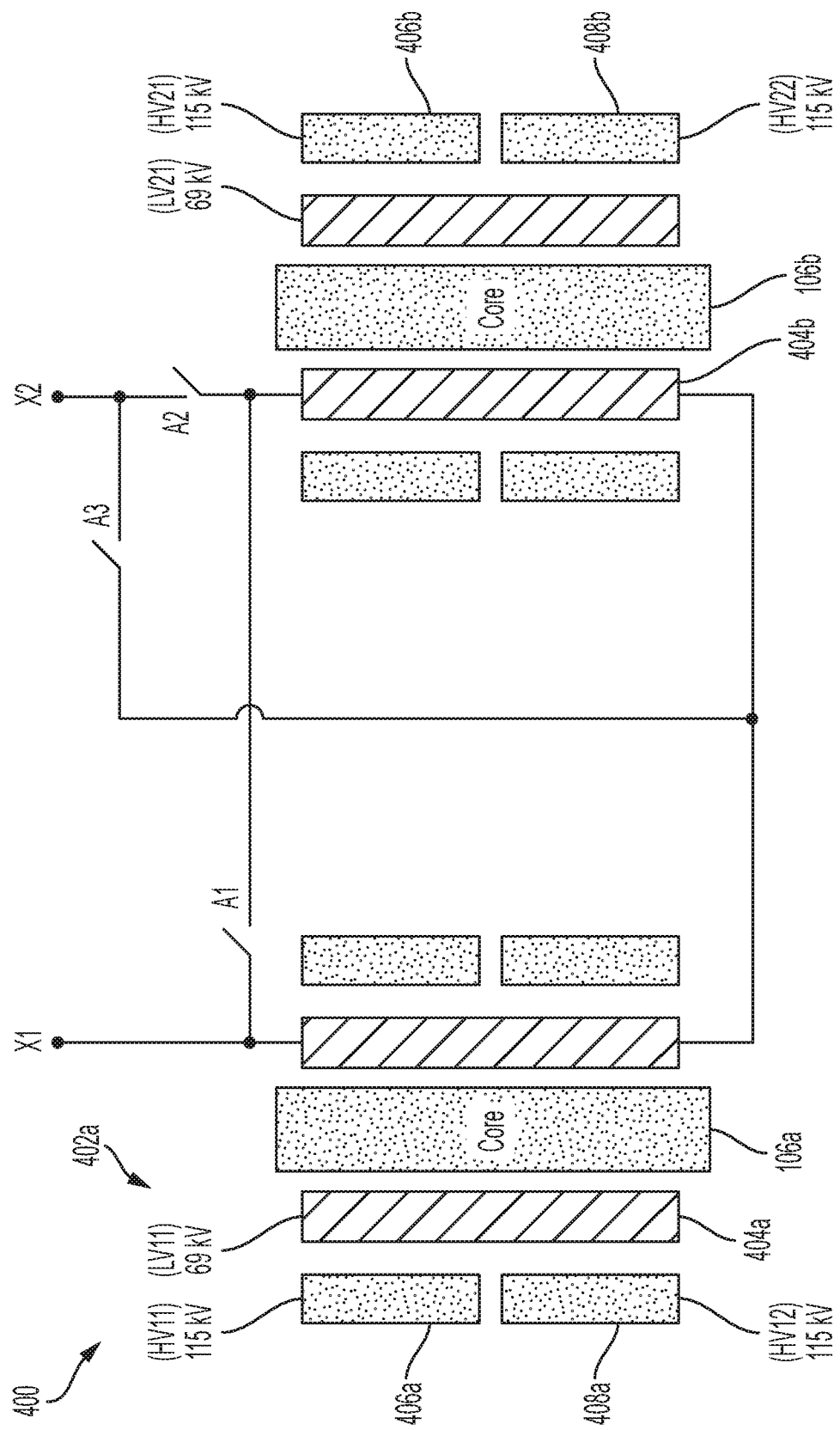
FIG. 7A illustrates an exemplary wiring diagram for low voltage windings for an active portion of the portion of the transformer shown in FIGS. 6A and 6B having low voltage cleats and lead connections on the low voltage side of the transformer according to an embodiment of the subject application.
Figure 7B:
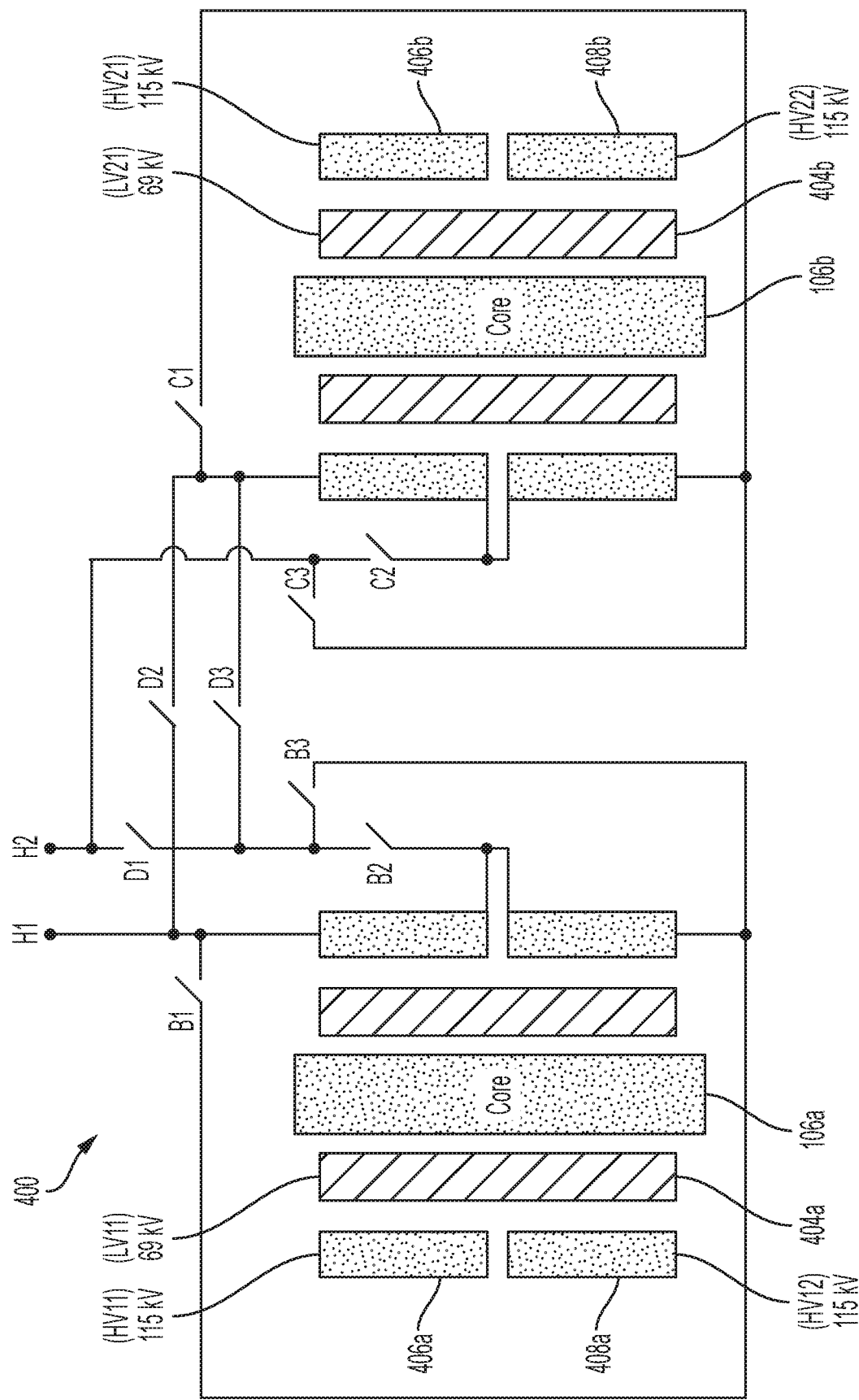
FIG. 7B illustrates an exemplary wiring diagram for high voltage windings of the active portion for the transformer shown in FIGS. 6A and 6B, and which can be used in conjunction with the exemplary wiring diagram for low voltage windings shown in FIG. 7A.

FIGS. 7A and 7B illustrate exemplary low voltage and high voltage winding wiring diagrams, respectively, that are configured to provide both parallel and series connections between the low voltage windings 404a, 404b and the high voltage windings 406a, 408a, 406b, 408b of each set of windings 402a, 402b, as well as between multiple windings 406a, 408a, 406b, 408b within each set of windings 402a, 402b. The wiring shown in FIGS. 7A and 7B, as well as the associated switches, can be pre-wired in a manner that can selectively provide parallel and series connections between the windings. For example, the low voltage winding diagram shown in FIG. 7A is similar to that shown in FIG. 5B, including with respect to the locations and connections for the first and second low voltage bushings X1, X2 and the LV switches A1, A2, A3. Thus, similar to the above discussion with respect to at least FIG. 5B, closing the first and third LV switches A1, A3 while leaving the second LV switch open A2 can result in the low voltage windings 404a, 404b of the first and second winding sets 402a, 402b being connected in parallel. Accordingly, in the illustrated embodiment in which the first and second low voltage windings 404a, 404b (LV11, LV21) are each rated at 69 kV, by connecting the low voltage windings 404a, 404b in parallel, the low voltage rating of the transformer 200 can also be 69 kV. Conversely, by using the same wiring of the transformer 200 to connect these same low voltage windings 404a, 404b in series, such as, for example, by opening the first and third LV switches A1, A3 and closing the second LV switch A2, the low voltage windings 404a, 404b of the first and second winding sets 402a, 402b are connected in series. According to the illustrated embodiment in which the first and second low voltage windings 404a, 404b (LV11, LV21) are each rated at 69 kV, connecting the first and second low voltage windings 404a, 404b (LV11, LV21) in series can result in the transformer 200 having an increased low voltage rating of 138 kV.

The wiring diagram in FIG. 7B for the same transformer associated with FIG. 7A can also be configured to selectively connect the high voltage windings 406a, 408a (HV11, HV12), which can be split windings that use radial exits, of the first set of windings 402a in parallel and series with each other, as well as in parallel or series with the similar high voltage windings 406b, 408b (HV21, HV22) of the second sets of windings 402b. Similarly, the wiring diagram shown in FIG. 7B also allows for the high voltage windings 406b, 408b (HV21, HV22) of the second sets of windings 402b to be selectively connected in parallel or series with each other. Further, the type of connection selected for the multiple high voltage windings in one set of windings, such as whether the first and second high voltage windings 406a, 408a of the first set of windings 402a are electrically connected to each other in parallel or series, can be different than the type of electrical connection selected for the multiple high voltage windings 406b, 408b in the other, second set of windings 402b.

For example, with respect to the high voltage windings 406a, 408a of the first set of windings 402a, as shown in FIG. 7B, a high voltage bushing H1 can be electrically connected to an axial exit to the high voltage windings 406a, 408a via one or more cleats, leads, cables, and/or bus bars, with one of the high voltage windings 408a being selectively electrically coupled to the high voltage bushing H1 via the closing of a first HV set switch B1. Additionally, each of the first and second high voltage windings 406a, 408a of the first set of windings 402a can include radial exits that can be selectively electrically connected to a second high voltage bushing H2, such as, for example, by one or more cleats, leads, cables, and/or bus bars. According to the embodiment shown in FIG. 7B, the first high voltage winding 406a can be connected in parallel to the second voltage winding 408a of the first set of windings 402a when at least a first and third HV set switches (B1, B3) are in closed positions, and a second HV set switch B2 is in an open position. Thus, in the illustrated embodiment in which the first and second high voltage windings 406a, 408a of the first set of windings 402a have a voltage rating of 115 kV, connecting the first and second high voltage windings 406a, 408a of the first set of windings 402a in parallel with each other can result in the first and second high voltage windings 406a, 408a of the first set of windings 402a contributing 115 kV to the high voltage outputted by the transformer 200.

Conversely, the illustrated embodiment of the subject application also allows for the selective electrical connection of the first and second high voltage windings 406a, 408a of the first set of windings 402a to be a series connection. Moreover, according to the illustrated embodiment, the first high voltage winding 406a and the second voltage winding 408a of the first set of windings 402a can be connected in series when at least the first and third set HV set switches B1, B3 are in an opened position, and the second HV set switch B2 is in the closed position. In the illustrated embodiment in which the first and second high voltage windings 406a, 408a of the first set of windings 402a have a voltage rating of 115 kV, connecting the first and second high voltage windings 406a, 408a of the first set of windings 402a in series can result in the first and second high voltage windings 406a, 408a of the first set of windings 402a contributing 230 kV to the high voltage outputted by the transformer 200.

The first and second high voltage windings 406b, 408b of the second set of windings 402b can similarly be selectively operated in parallel and series with each other. For example, according to the wiring diagram shown in FIG. 7B, the first and second high voltage windings 406b, 408b of the second set of windings 402b can be connected in parallel with each other at least when the first and second HV set switches C1, C2 are closed and the third HV set switch C3 is opened. As each of the first and second high voltage windings 406b, 408b of the second set of windings 402b are also rated for 115 kV, connecting the first and second high voltage windings 406b, 408b of the second set of windings 402b in parallel can result in the first and second high voltage windings 406b, 408b of the second set of windings 402b contributing 115 kV to the high voltage outputted by the transformer 200. Conversely, by having at least the first and second HV set switches C1, C2 open, and the third HV set switch C3 closed, the first and second high voltage windings 406b, 408b of the second set of windings 402b can be connected together in series, and thereby contribute in the illustrated example 230 kV to the high voltage outputted by the transformer 200.

Additionally, as shown in the embodiment depicted in FIG. 7B, the high voltage windings 406a, 408a from the first set of windings 402a can be also connected in both parallel and series to the high voltage windings 406b, 408b from the second set of windings 402b. According to the illustrated embodiment, by at least having first and second HV set switches D1, D2 closed and, a third HV set switch open D3, the high voltage windings 406a, 408a from the first set of windings 402a can be connected in parallel to the high voltage windings 406b, 408b of the second set of windings 402b. According to the embodiment depicted in FIG. 7B, if the high voltage windings 406a, 408a of the first set of windings 402a are connected in parallel, and the high voltage windings 406b, 408b of the second set of windings 402b are connected in parallel, connecting, the high voltage windings 406a, 408a of the first set of windings 402a to the high voltage windings 406b, 408b of the second set of windings 402b in parallel can result in the HV side of the associated transformer having a voltage rating of 115 kV. Alternatively, if the high voltage windings 406a, 408a of this same first set of windings 402a are connected in series, and the high voltage windings 406b, 408b of this same second set of windings 402b are also connected in series, connecting, the high voltage windings 406a, 408a of the first set of windings 402a to the high voltage windings 406b, 408b of the second set of windings 402b in parallel will result in the HV side of the associated transformer having a voltage rating of 230 kV. Further, if instead the high voltage windings 406a, 408a of this same first set of windings 402a are connected in parallel, and the high voltage windings 406b, 408b of the same second set of windings 402b are connected in series, or vice versa, connecting, the high voltage windings 406a, 408a of the first set of windings 402a to the high voltage windings 406b, 408b of the second set of windings 402b in parallel will result in the HV side of the associated transformer having a voltage rating of 345 kV. Additionally, connecting the high voltage windings 406a, 408a of the first set of windings 402a in series with each other, the high voltage windings 406b, 408b of the second set of windings 402b in series with each other, and the high voltage windings 406a, 408a, 406b, 408b of the first and second sets of windings 402a, 402b in series with each other would, in the discussed example, result in the HV side of the associated transformer 200 having a voltage rating of 460 kV.

Thus, providing a transformer 200 having sets of windings 402a, 402b in which the individual windings 404a, 404b, 406a, 408a, 406b, 408b within the sets of windings 402a, 402b are pre-wired in for both parallel and series connections, and the sets of windings 402a, 402b are also pre-wired for both parallel and series connections with each other, can accommodate the transformer 200 being able to allow a selection from a plurality of available voltage ratios. Moreover, according to the above-discussed exemplary transformer 200 from FIGS. 7A-7B, the transformer 200 can selectively provide, via user selection of activating either the parallel or series connections, or a combination thereof, the standard and non-standard low voltage/high voltage ratios of 69 kV/115 kV, 69 kV/230 kV, 69 kV/345 kV, 69 kV/460 kV, 138 kV/115 kV, 138 kV/230 kV, 138 kV/345 kV, and 138 kV/460 kV. Further, while the above embodiment from FIGS. 7A and 7B is discussed with respect to use of a DY core 104 (FIGS. 6A and 6B), a similar configuration can also be obtained using a D core 102, among other types of cores.

As indicated above, according to the illustrated embodiments, transformers 200 of the subject application can be configured to include a plurality of sets of windings, as well as windings within those sets, that are pre-wired to accommodate both parallel and series connections so as to provide the ability to selectively vary the voltage ratio outputted by a single transformer 200. Such embodiments can accommodate at least generally common or traditional voltage ratios, as indicated in FIG. 1, by manufacturing relatively few different configurations of selectively adjustable transformers 200. For example, in addition to the above-discussed examples, FIGS. 8-13 illustrate other transformer 200 configurations in which windings, as well as sets of windings, can be pre-wired to selectively accommodate parallel and series connections between the windings that can also generally satisfy at least the more traditional power grid voltage ratios that are shown in FIG. 1.

Figure 8:
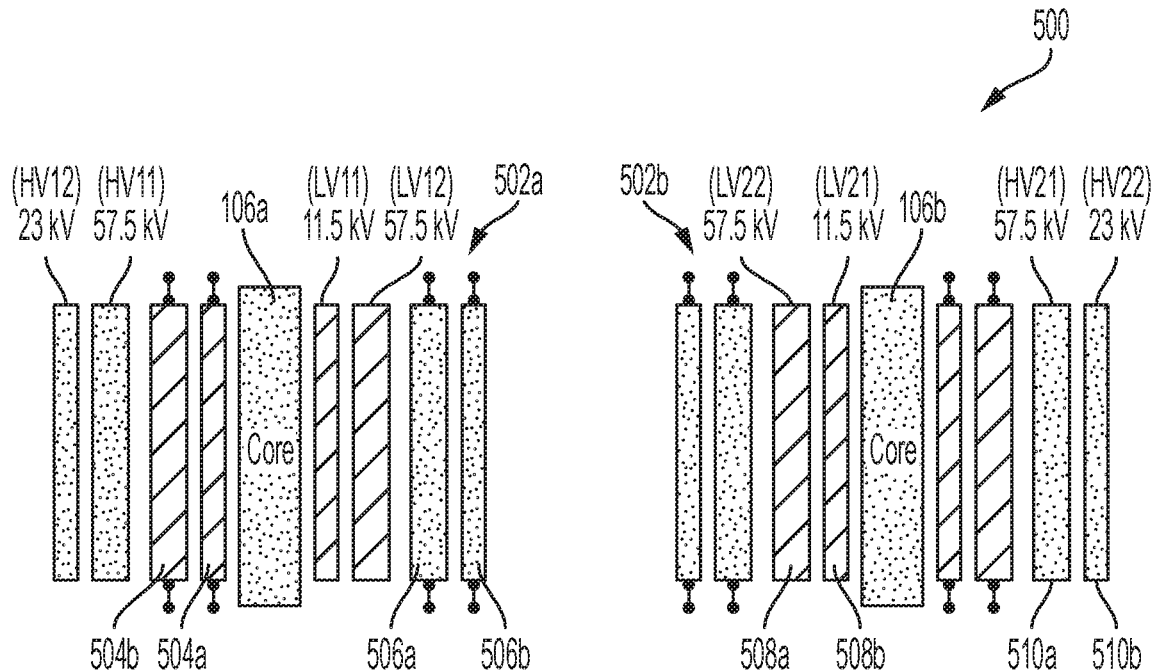
FIGS. 8-13 illustrates exemplary active parts for multi-voltage power transformers that are each adaptable to provide a plurality of selectable power grid voltage ratios according to embodiments of the subject application.

With respect to FIG. 8, FIG. 8 illustrates, at least for purposes of discussion, a portion of an active part 500 for a multi-voltage power transformer 200 that is adaptable to provide a plurality of selectable power grid voltage ratios. The exemplary embodiment shown in FIG. 8 includes a first set of windings 502a positioned about a first leg 106a of the transformer core 104 having a pair of low voltage windings 504a, 504b (LV11, LV12) having voltage ratings of 11.5 kV and 57 kV, respectively, and a pair of high voltage windings 506a, 506b (HV11, HV12) having voltage ratings of 23 kV and 57.5 kV, respectively. As previously discussed, the low voltage windings 504a, 504b (LV21, LV22) of the first set of windings 502a can be pre-wired to accommodate both parallel and series connections with each other, and the high voltage windings 506a, 506b (HV21, HV22) can be similarly pre-wired to accommodate both parallel and series connections with each other. Similarly, the illustrated active part 500 shown in FIG. 8 also includes a second set of windings 502b positioned about a second leg 106b of the transformer core 104 that includes low voltage windings 508a, 508b and high voltage windings 510a, 510b that have the same voltage ratings as the corresponding winding 504a, 504b, 506a, 506b of the first set of windings 502a. Additionally, the low voltage windings 508a, 508b of the second set of windings 502b can be pre-wired to accommodate both parallel and series connections with each other, and the high voltage windings 510a, 510b can be similarly pre-wired to accommodate both parallel and series connections with each other. Further, similar to the previously discussed embodiments, the low voltage windings 504a, 504b, 508a, 508b of the first and second sets of windings 502a, 502b can also be pre-wired to accommodate both parallel and series connections with each other, and the high voltage windings 506a, 506b, 510a, 510b of the first and second sets of windings 502a, 502b can be pre-wired to accommodate both parallel and series connections with each other.

As indicated by below Table 1, the configuration illustrated in FIG. 8 can accommodate the low voltage windings 504a, 504b, 508a, 508b, being selectively connected in parallel and/or series so that the transformer 200 is configured to selectively output a low voltage rating of 69 kV, 115 kV, or 138 kV. Similarly, as shown by below Table 1, the configuration illustrated in FIG. 8 can accommodate the high voltage windings 506a, 506b, 510a, 510b, being selectively connected in parallel and/or series so that the transformer 200 is configured to selectively output a high voltage rating of 115 kV, 138 kV, or 161 kV. Thus, for example, as shown below, the transformer 200 can selectively provide a low voltage/high voltage ratio of 69 kV/161 kV via (1) connecting the low voltage windings 504a, 504b (LV11, LV12) of the first set of windings 502a in series with each other, (2) connecting the low voltage windings 508a, 508b (LV21, LV22) of the second set of windings 502b in series with each other, (3) connecting the low voltage windings 504a, 504b (LV11, LV12) of the first set of windings 502a in parallel ("//") with the low voltage windings 508a, 508b (LV21, LV22) of the second set of windings 502b, (4) connecting the high voltage windings 506a, 506b (HV11, HV12) of the first set of windings 502a in series with each other, (5) connecting the high voltage windings 510a, 510b (HV21, HV22) of the second set of windings 502b in series with each other, and (6) connecting the high voltage windings 506a, 506b (HV11, HV12) of the first set of windings 502a in series with the high voltage windings 510a, 510b (HV21, HV22) of the second set of windings 502b.

TABLE 1

| HV voltages | LV voltages | | |
|---|---|---|---|
| | 138 kV | 115 kV | 69 kV |
| 161 kV | LV11 series LV12 series L21 series L22; HV11 series HV12 series HV21 series HV22 | (LV12 series LV22); HV11 series HV12 series HV21 series HV22 | (LV11 series LV12) // (LV21 series LV22); HV11 series HV12 series HV21 series HV22 |

TABLE 1-continued

| HV voltages | LV voltages | | |
|---|---|---|---|
| | 138 kV | 115 kV | 69 kV |
| 138 kV | LV11 series LV12 series L21 series L22; HV11 series HV21 series (HV12 // HV22) | (LV12 series LV22); HV11 series HV21 series (HV12 // HV22) | (LV11 series LV12) // (LV21 series LV22); HV11 series HV21 series (HV12 // HV22) |
| 115 kV | LV11 series LV12 series L21 series L22; (HV11 series HV21) | (LV12 series LV22); (HV11 series HV21) | (LV11 series LV12) // (LV21 series LV22); HV11 series HV21 |

Additionally, as seen in above Table 1, the transformer 200 can also be configure such that at least some of the low voltage windings 504a, 504b, 508a, 508b (LV11, LV12, LV21, LV22) and/or high voltage windings 506a, 506b, 510a, 510b (HV11, HV12, HV21, HV22) can be selectively disconnected to attain a particular voltage output. For example, as shown above, a high voltage output can be attained via connecting only one of the high voltage windings 506a (HV11) of the first set of windings 502a to only one of the of the high voltage windings 510a (HV21) of the second set of windings 502b, thereby leaving the other high voltage windings 506b, 510b (HV12, HV22) generally electrically disconnected. Further, as also indicated above, according to certain embodiments, a connection between the low or voltage windings 504a, 504b, 508a, 508b of the first and second sets of windings 502a, 502b can be different than the connection between other, similar low or high voltage windings 504a, 504b, 508a, 508b. For example, as shown above, in connection with obtaining a high voltage output of 138 kV, high voltage windings 506a, 510a (HV11, HV21) from each of the first and second sets of windings 502a, 502b can be selectively connected to each other in series, while other high voltage windings 506b, 510b (HV12, HV22) from each of the first and second sets of windings 502a, 502b are selectively connected to each other in parallel ("//").

Figure 9:
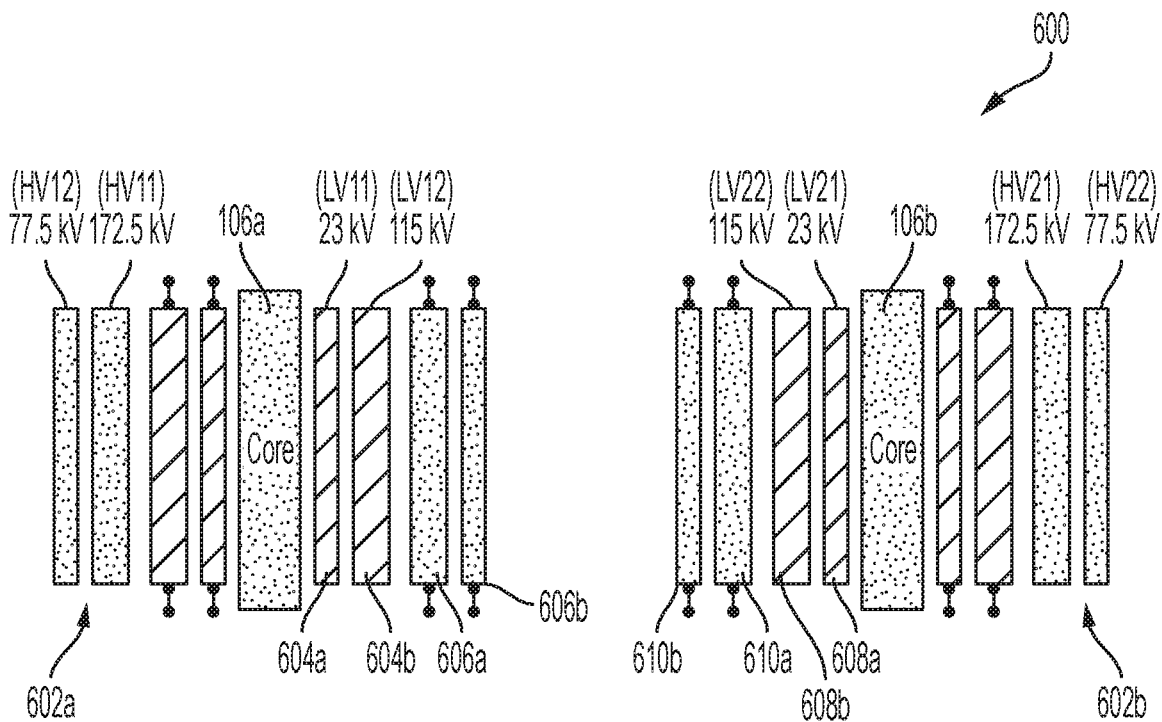

FIG. 9 illustrates another active part 600 for a multi-voltage power transformer 200 that is similar to that of FIG. 8 with the exception that, for the first and second sets of windings 602a, 602b, the low voltage windings 604a, 608a (LV11, LV21) have a voltage rating of 23 kV, low voltage windings 604b, 608b (LV12, LV22) have a voltage rating of 115 kV, high voltage windings 606a, 610a (HV11, HV21) have a voltage rating of 77.5 kV, and high voltage windings 608b, 610b (HV12, HV22) have a voltage rating of 172.5 kV. Similar to the above-discussed embodiments, having the transformer 200 with such ratings for the windings, and in which the windings are pre-wired for parallel and series connections, can accommodate the transformer 200 selectively outputting one of a plurality of low voltage/high voltage ratios. Moreover, as shown in below Table 2, the configuration of the active part 600 shown in FIG. 9 can output at least generally traditional voltage ratios involving a low voltage rating being 115 kV, 138 kV, 161 kV, 230 kV, and a high voltage rating being 345 kV and 500 kV, among other voltages.

TABLE 2

| HV voltages | LV voltages | | | |
|---|---|---|---|---|
| | 230 kV | 161 kV | 138 kV | 115 kV |
| 500 kV | LV12 series LV22; HV11 series HV12 series HV21 series HV22 | (LV12 // LV22) series (LV11 series LV21); HV11 series HV12 series HV21 series HV22 | (LV12 // LV22) series (LV11 // LV21); HV11 series HV12 series HV21 series HV22 | (LV12 // LV22); HV11 series HV12 series HV21 series HV22 |
| 345 kV | LV12 series LV22; HV11 series HV21 | (LV12 // LV22) series (LV11 series LV21); HV11 series HV21 | (LV12 // LV22) series (LV11 // LV21); HV11 series HV21 | (LV12 // LV22); HV11 series HV21 |

Figure 10:
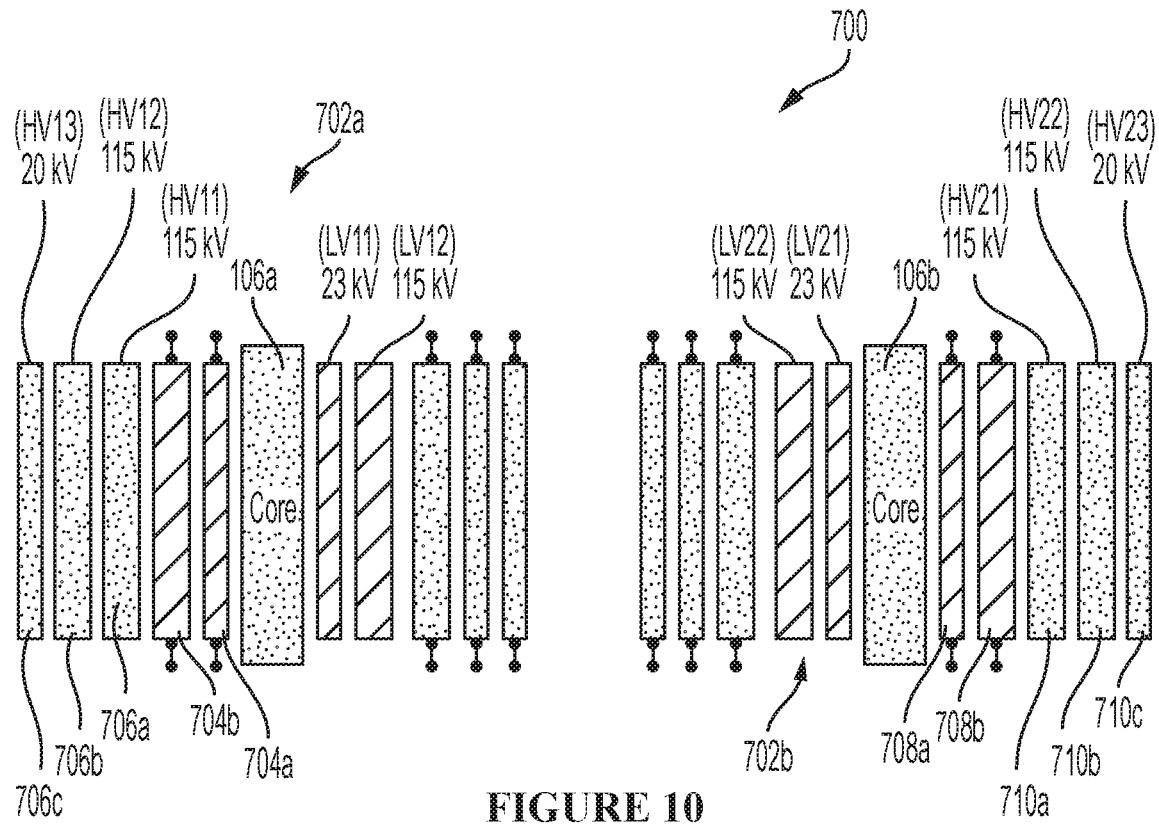

FIG. 10 illustrates another exemplary active part 700 for a multi-voltage power transformer 200. As shown, the first set of windings 708a are positioned about a first leg 106a of the transformer core 104, and includes a pair of low voltage windings 704a, 704b (LV11, LV12) having voltage ratings of 23 kV and 115 kV, respectively, and three of high voltage windings 706a, 706b, 706c (HV11, HV12, HV13) having voltage ratings of 115 kV, 115 kV, and 20 kV, respectively. Similarly, the illustrated active part 700 shown in FIG. 10 also includes a second set of windings 702b positioned about a second leg 106b of the transformer core 104 that includes low voltage windings 708a, 708b (LV21, LV22) and high voltage windings 710a, 710b, 710c (HV21, HV22, HV23) having the same voltage ratings as the corresponding winding 704a, 704b, 706a, 706b, 706c of the first set of windings 702a. As previously discussed, the first and second sets of windings 702a, 702b can be prewired to accommodate selective parallel and series connections within, and between, the first and second sets of windings 702a, 702b. As shown below in Table 3, such an active part 700 configuration for a transformer 200 can provide at least generally traditional voltage ratios involving low voltage ratings of 115 kV, 138 kV, 161 kV, 230 kV, and high voltage ratings of 230 kV, 345 kV and 500 kV, among other voltages.

TABLE 3

| HV voltages | LV voltages | | | |
|---|---|---|---|---|
| | 230 kV | 161 kV | 138 kV | 115 kV |
| 500 kV | LV12 series LV22; HV11 series HV12 series HV13 series HV21 series HV22 series HV23 | (LV12 // LV22) series (LV11 series LV21); HV11 series HV12 series HV13 series HV21 series HV22 series HV23 | (LV12 // LV22) series (LV11 // LV21); HV11 series HV12 series HV13 series HV21 series HV22 series HV23 | (LV12 // LV22); HV11 series HV12 series HV13 series HV21 series HV22 series HV23 |
| 345 kV | LV12 series LV22; HV11 // HV21 series HV12 series HV22 | (LV12 // LV22) series (LV11 series LV21); HV11 // HV21 series HV12 series HV22 | (LV12 // LV22) series (LV11 // LV21); HV11 // HV21 series HV12 series HV22 | (LV12 // LV22); HV11 // HV21 series HV12 series HV22 |
| 230 kV | LV12 series LV22; HV11 // HV21 series HV12 // HV22 | (LV12 // LV22) series (LV11 series LV21); HV11 // HV21 series HV12 // HV22 | (LV12 // LV22) series (LV11 // LV21); HV11 // HV21 series HV12 // HV22 | (LV12 // LV22); HV11 // HV21 series HV12 // HV22 |

Figure 11:
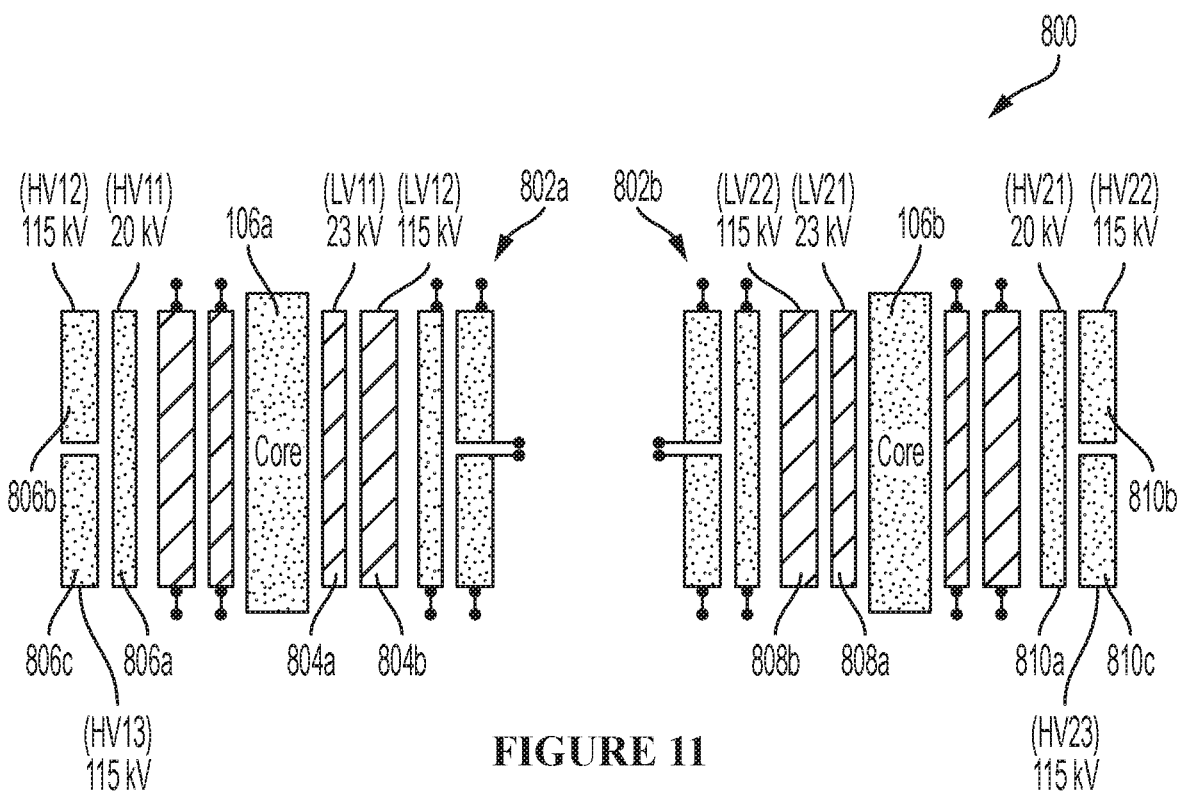

FIG. 11 illustrates another exemplary active part 800 for a multi-voltage power transformer 200. As shown, the first set of windings 800a are positioned about a first leg 106a of the transformer core 200, and includes a pair of low voltage windings 804a, 804b (LV11, LV12) having voltage ratings of 23 kV and 115 kV, respectively, and three of high voltage windings 806a, 806b, 806c (HV11, HV12, HV13) having voltage ratings of 20 kV, 115 kV, and 115 kV, respectively. Similarly, the illustrated active part 800 shown in FIG. 11 also includes a second set of windings 802b positioned about a second leg 106b of the transformer core 104 that includes low voltage windings 808a, 808b (LV21, LV22) and high voltage windings 810a, 810b, 810c (HV21, HV22, HV23) having the same voltage ratings as the corresponding winding 804a, 804b, 806a, 806b, 806c of the first set of windings 802a. As previously discussed, the first and second sets of windings 802a, 802b can be prewired to accommodate selective parallel and series connections within, and between, the first and second sets of windings 802a, 802b. As shown below in Table 4, such an active part 800 configuration for a transformer 200 can provide at least generally traditional voltage ratios involving low voltage ratings of 115 kV, 138 kV, 161 kV, 230 kV, and a high voltage ratings of 230 kV, 345 kV and 500 kV, among other voltages.

Figure 12:
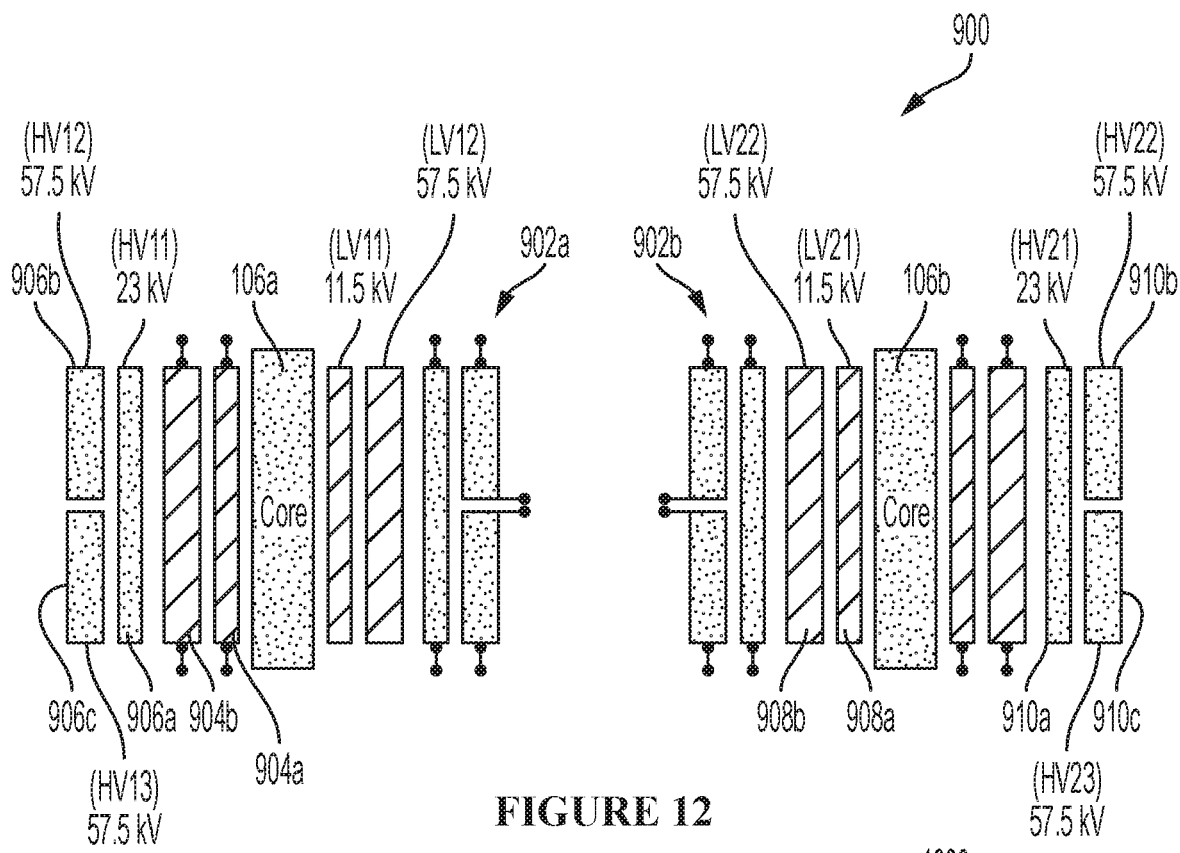

FIG. 12 illustrates another exemplary active part 900 for a multi-voltage power transformer 200. As shown, the first set of windings 902a are positioned about a first leg 106a of the transformer core 200, and includes a pair of low voltage windings 904a, 904b (LV11, LV12) having voltage ratings of 11.5 kV and 57.5 kV, respectively, and three of high voltage windings 906a, 906b, 906c (HV11, HV12, HV13) having voltage ratings of 23 kV, 57.5 kV, and 57.5 kV, respectively. Similarly, the illustrated active part 900 shown in FIG. 12 also includes a second set of windings 902b positioned about a second leg 106b of the transformer core 104 that includes low voltage windings 908a, 908b (LV21, LV22) and high voltage windings 910a, 910b, 910c (HV21, HV22, HV23) having the same voltage ratings as the corresponding winding 904a, 904b, 906a, 906b, 906c of the first set of windings 902a. As previously discussed, the first and second sets of windings 902a, 902b can be prewired to accommodate selective parallel and series connections within, and between, the first and second sets of windings 902a, 902b. As shown below in Table 5, such an active part 900 configuration for a transformer 200 can provide at least generally traditional voltage ratios involving low voltage ratings of 69 kV, 115 kV, and 138 kV, and high voltage ratings of 115 kV, 138 kV, 161 kV, and 230 kV, among other voltages.

TABLE 4

| HV voltages | LV voltages | | | |
|---|---|---|---|---|
| | 230 kV | 161 kV | 138 kV | 115 kV |
| 500 kV | LV12 series LV22; HV11 series HV12 series HV13 series HV21 series HV22 series HV23 | (LV12 // LV22) series (LV11 series LV21); HV11 series HV12 series HV13 series HV21 series HV22 series HV23 | (LV12 // LV22) series (LV11 // LV21); HV11 series HV12 series HV13 series HV21 series HV22 series HV23 | (LV12 // LV22); HV11 series HV12 series HV13 series HV21 series HV22 series HV23 |
| 345 kV | LV12 series LV22; (HV12 // HV13) series HV22 series HV23 | (LV12 // LV22) series (LV11 series LV21); (HV12 // HV13) series HV22 series HV23 | (LV12 // LV22) series (LV11 // LV21); (HV12 // HV13) series HV22 series HV23 | (LV12 // LV22); (HV12 // HV13) series HV22 series HV23 |
| 230 kV | LV12 series LV22; (HV12 // HV13) series (HV22 // HV23) | (LV12 // LV22) series (LV11 series LV21); (HV12 // HV13) series (HV22 // HV23) | (LV12 // LV22) series (LV11 // LV21); (HV12 // HV13) series (HV22 // HV23) | (LV12 // LV22); (HV12 // HV13) series (HV22 // HV23) |

TABLE 5

| HV voltages | LV voltages | | |
|---|---|---|---|
| | 138 kV | 115 kV | 69 kV |
| 230 kV | LV11 series LV12 series LV21 series LV22 (HV12 series HV13) series (HV22 series HV22) | (LV12 series LV22) HV12 series HV13) series (HV22 series HV22) | (LV11 // LV21) series (LV12 // LV22) HV12 series HV13) series (HV22 series HV22) |
| 161 kV | LV11 series LV12 series LV21 series LV22 (HV12 series HV13) // (HV22 series HV23) series HV11 series HV21 | (LV12 series LV22) (HV12 series HV13) // (HV22 series HV23) series HV11 series HV21 | (LV11 // LV21) series (LV12 // LV22) (HV12 series HV13) // (HV22 series HV23) series HV11 series HV21 |
| 138 kV | LV11 series LV12 series LV21 series LV22 (HV12 series HV13) // (HV22 series HV23) series (HV11 // HV21) | (LV12 series LV22) HV12 series HV13) // (HV22 series HV23) series (HV11 // HV21) | (LV11 // LV21) series (LV12 // LV22) HV12 series HV13) // (HV22 series HV23) series (HV11 // HV21) |
| 115 kV | LV11 series LV12 series LV21 series LV22 (HV12 series HV13) // (HV22 series HV23) | ((LV12 series LV22) (HV12 series HV13) // (HV22 series HV23) | (LV11 // LV21) series (LV12 // LV22) (HV12 series HV13) // (HV22 series HV23) |

Figure 13:
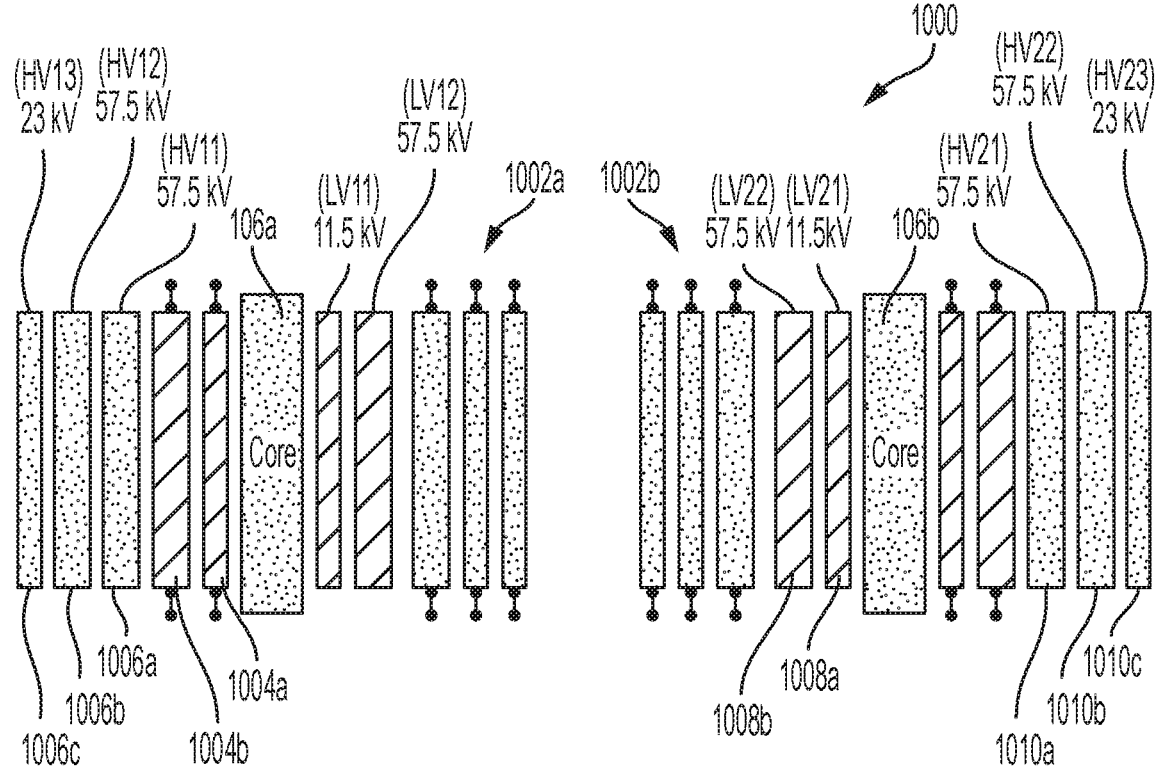

FIG. 13 illustrates another exemplary active part 1000 for a multi-voltage power transformer 200. As shown, the first set of windings 1002a are positioned about a first leg 106a of the transformer core 104, and includes a pair of low voltage windings 1004a, 1004b (LV11, LV12) having voltage ratings of 11.5 kV and 57.5 kV, respectively, and three of high voltage windings 1006a, 1006b, 1006c (HV11, HV12, HV13) having voltage ratings of 57.5 kV, 57.5 kV, and 23 kV, respectively. Similarly, the illustrated active part 1000 shown in FIG. 13 also includes a second set of windings 1002a positioned about a second leg 106b of the transformer core 104 that includes low voltage windings 1008a, 1008b (LV21, LV22) and high voltage windings 1010a, 1010b, 1010c (HV21, HV22, HV23) having the same voltage ratings as the corresponding winding 1004a, 1004b, 1006a, 1006b, 1006c of the first set of windings 1002a. As previously discussed, the first and second sets of windings 1002a, 1002b can be prewired to accommodate selective parallel and series connections within, and between, the first and second sets of windings 1002a, 1002b. As shown below in Table 6, such an active part 1000 configuration for a transformer 200 can provide at least generally traditional voltage ratios involving low voltage ratings of 69 kV, 115 kV, and 138 kV, and high voltage ratings of 115 kV, 138 kV, 161 kV, and 230 kV, among other voltages.

TABLE 6

| HV voltages | LV voltages | | |
|---|---|---|---|
| | 138 kV | 115 kV | 69 kV |
| 230 kV | LV11 series LV12 series L21 series L22 HV11 series HV12 series HV21 series HV22 | (LV12 series LV22) HV11 series HV12 series HV21 series HV22 | (LV11 series LV12) // (LV21 series LV22) HV11 series HV12 series HV21 series HV22 |
| 161 kV | LV11 series LV12 series L21 series L22 (HV11 //HV21) series (HV12//HV22) series HV13 series HV23 | (LV12 series LV22) (HV11 //HV21) series (HV12//HV22) series HV13 series HV23 | (LV11 series LV12) // (LV21 series LV22) (HV11 //HV21) series (HV12//HV22) series HV13 series HV23 |
| 138 kV | LV11 series LV12 series L21 series L22 HV11 //HV21) series (HV12//HV22) series (HV13//HV23) | (LV12 series LV22) HV11 //HV21) series (HV12//HV22) series (HV13//HV23) | (LV11 series LV12) // (LV21 series LV22) HV11 //HV21) series (HV12//HV22) series (HV13//HV23) |
| 115 kV | LV11 series LV12 series L21 series L22 HV11 //HV21) series (HV12//HV22) | ((LV12 series LV22) HV11 //HV21) series (HV12//HV22) | (LV11 series LV12) // (LV21 series LV22) HV11 //HV21) series (HV12//HV22) |

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A multi-voltage power transformer for providing a plurality of different power grid voltage ratios, the power transformer comprising:
    a transformer core;
    a first set of windings disposed about a first main leg of the transformer core; and
    a second set of windings disposed about a second main leg of the transformer core; and
    a switch connected between the first set of windings and the second set of windings to selectively provide a pre-existing parallel connection providing a first power grid voltage ratio between the first set of windings and the second set of windings and a pre-existing series connection providing a second power grid voltage ratio between the first set of windings and the second set of windings.

2. The power transformer of claim 1,
    wherein the first set of windings includes at least one first low voltage winding and at least one first high voltage winding, the at least one first high voltage winding having a higher voltage rating than the at least one first low voltage winding,
    wherein the second set of windings includes at least one second low voltage winding and at least one second high voltage winding, the at least one second high voltage winding having a higher voltage rating than the at least one second low voltage winding, and
    wherein the switch accommodates selection of the series connection or the parallel connection between at least one of (a) the at least one first low voltage winding and the at least one second low voltage winding, and (b) the at least one first high voltage winding and the at least one second high voltage winding.

3. The power transformer of claim 2, wherein the switch accommodates selection of either the series connection or the parallel connection for each of the (a) the at least one first low voltage winding and the at least one second low voltage winding, and (b) the at least one first high voltage winding and the at least one second high voltage winding.

4. The power transformer of claim 1, wherein the first set of windings includes a first plurality of windings being electrically coupled to the switch to selectively use a pre-existing parallel connection and a pre-existing series connection between the first plurality of windings.

5. The power transformer of claim 1, wherein the second set of windings includes a second plurality of windings being electrically coupled to the switch to selectively provide a pre-existing parallel connection and a pre-existing series connection between the second plurality of windings.

6. The power transformer of claim 1, wherein the switch further includes a plurality of connectors, the plurality of connectors being electrically coupled to the first set of windings and the second set of windings, a position of the plurality of connectors being adjustable to selectively adjust between the parallel connection and the series connection between the first set of windings and the second set of windings.

7. The power transformer of claim 6, wherein the plurality of connectors comprises a de-energized tap changer or an on load tap changer.

8. The power transformer of claim 6, wherein the switch further comprises a selector housing, and wherein the plurality of connectors are housed in an insulated environment within the selector housing.

9. The power transformer of claim 8, wherein the insulated environment comprises one of an oil insulated environment, an ester insulated environment, a sulfur hexafluoride insulated environment, or a vacuum insulated environment.

10. A multi-voltage power transformer for providing a plurality of different power grid voltage ratios, the power transformer comprising:
    a first set of windings comprising at least one first low voltage winding and at least one first high voltage winding, the at least one first high voltage including at least one winding having a voltage rating that is higher than a voltage rating of the at least one first low voltage winding; and
    a second set of windings comprising at least one second low voltage winding and at least one second high voltage winding, the at least one second high voltage including at least one winding having a voltage rating that is higher than a voltage rating of the at least one second low voltage winding; and
    a switch,
    wherein the apparatus includes a pre-existing parallel electrical connection providing a first power grid voltage ratio between the at least one first low voltage winding and the at least one second low voltage winding and a pre-existing serial electrical connection providing a second power grid voltage ratio between the at least one first low voltage winding and the at least one second low voltage winding, and
    wherein the apparatus includes a pre-existing parallel electrical connection providing a third power grid voltage ratio between the at least one first high voltage winding and the at least one second high voltage winding and a pre-existing serial electrical connection providing a fourth power grid voltage ratio between the at least one first high voltage winding and the at least one second high voltage winding.

11. The power transformer of claim 10, wherein the switch is configured to selectively activate either the parallel electrical connection or the serial electrical connection between the at least one first low voltage winding and the at least one second low voltage winding, and to selectively activate either the parallel electrical connection or the serial electrical connection between the at least one first high voltage winding and the at least one second high voltage winding.

12. The power transformer of claim 10, the switch further comprising a plurality of connectors, at least some connectors of the plurality of connectors being positioned to selectively activate one of the parallel electrical connection and the serial electrical connection between the at least one first low voltage winding and the at least one second low voltage winding, and at least some other connectors of the plurality of connectors being positioned to selectively activate one of the parallel electrical connection and the serial electrical connection between the at least one first high voltage winding and the at least one second high voltage winding.

13. The power transformer of claim 12, wherein the plurality of connectors comprises a de-energized tap changer or an on load tap changer.

14. The power transformer of claim 12, wherein the switch further includes a selector housing, and wherein the plurality of connectors are housed in an insulated environment within the selector housing.

15. The power transformer of claim 14, wherein the insulated environment comprises one of an oil insulated environment, an ester insulated environment, a sulfur hexafluoride insulated environment, or a vacuum insulated environment.

16. The power transformer of claim 12, wherein the apparatus further comprises a transformer core, the first set of windings being disposed about a first main leg of the transformer core, and the second set of windings being disposed about a second main leg of the transformer core.

17. A multi-voltage power transformer for providing a plurality of different power grid voltage ratios, the power transformer comprising:
   a first set of windings disposed about a first leg of a transformer core, at least two windings of the first set of windings being electrically coupled to a first switch to selectively provide a pre-existing parallel connection providing a first power grid voltage ratio between the at least two windings of the first set of windings and a pre-existing serial connection providing a second power grid voltage ratio between the at least two windings of the first set of windings;
   a second set of windings disposed about a second leg of the transformer core, at least two windings of the second set of windings being electrically coupled to a second switch to selectively provide a pre-existing parallel connection providing a third power grid voltage ratio between the at least two windings of the second set of windings and a pre-existing serial connection providing a fourth power grid voltage ratio between the at least two windings of the second set of windings; and
   a third switch, wherein the first set of windings and the second set of windings is electrically coupled to the third switch to selectively provide a parallel connection providing a fifth power grid voltage ratio between the first set of windings and the second set of windings and a serial connection providing a sixth power grid voltage ratio between the first set of windings and the second set of windings.

18. The power transformer of claim 17, the first switch further comprising a first plurality of connectors positioned to selectively activate one of the parallel connection and the serial connection between the at least two windings of the first set of windings,
   the second switch comprising a second plurality of connectors positioned to selectively activate one of the parallel connection and the serial connection between the at least two windings of the second set of windings, and
   the third switch comprising a third plurality of connectors positioned to selectively activate one of the parallel connection and the serial connection between the first set of windings and the second set of windings.

19. The power transformer of claim 18, wherein the first plurality of connectors, the second plurality of connectors, and the third plurality of connectors comprise a de-energized tap changer or an on load tap changer.

20. The power transformer of claim 2, wherein the at least one first low voltage winding has a voltage rating of at least 69 kilovolts,
   wherein the at least one second low voltage winding has a voltage rating of at least 69 kilovolts.

* * * * *